United States Patent
Rajendran et al.

(10) Patent No.: US 9,970,520 B2
(45) Date of Patent: May 15, 2018

(54) CONTINUOUS VARIABLE TRANSMISSION WITH UNIFORM INPUT-TO-OUTPUT RATIO THAT IS NON-DEPENDENT ON FRICTION

(71) Applicants: Raja Ramanujam Rajendran, Troy, MI (US); Prashanth Ram Rajendran, Troy, MI (US)

(72) Inventors: Raja Ramanujam Rajendran, Troy, MI (US); Prashanth Ram Rajendran, Troy, MI (US)

( * ) Notice: Subject to any disclaimer, the term of this patent is extended or adjusted under 35 U.S.C. 154(b) by 0 days. days.

(21) Appl. No.: 13/261,970

(22) PCT Filed: Mar. 18, 2014

(86) PCT No.: PCT/US2014/031136
§ 371 (c)(1),
(2) Date: Oct. 14, 2014

(87) PCT Pub. No.: WO2015/142323
PCT Pub. Date: Sep. 24, 2015

(65) Prior Publication Data
US 2015/0267794 A1    Sep. 24, 2015

Related U.S. Application Data

(60) Provisional application No. 61/788,563, filed on Mar. 15, 2013.

(51) Int. Cl.
*F16H 29/20* (2006.01)
*F16H 29/02* (2006.01)
(Continued)

(52) U.S. Cl.
CPC ......... *F16H 29/20* (2013.01); *F16H 19/043* (2013.01); *F16H 29/02* (2013.01); *F16H 29/08* (2013.01);
(Continued)

(58) Field of Classification Search
CPC .............. F16H 29/20; F16H 2037/023; F16H 2037/025; F16H 2037/026; F16H 2037/028; F16H 55/084; F16H 29/00; F16H 29/02; F16H 29/04; F16H 29/06; F16H 29/08; F16H 29/12; F16H 29/14; F16H 29/16;
(Continued)

(56) References Cited

U.S. PATENT DOCUMENTS 2,364,393 A * 12/1944 Seeck ................... F16H 21/14
                                                74/69
4,714,452 A * 12/1987 Kumm ................. F16H 55/54
                                                474/49
(Continued)

FOREIGN PATENT DOCUMENTS

FR         2841957 A1 *  1/2004    ............. F16H 29/08
WO     WO 8201406 A1 *  4/1982    ............. F16H 29/14

*Primary Examiner* — Victor L MacArthur
*Assistant Examiner* — Joseph H Brown

(57) ABSTRACT

A continuously variable transmission (CVT) that does not depend on friction to transmit power. A constant and uniform output angular velocity can be achieved when the input angular velocity is constant and uniform by modifying the rate of change of angular displacement of the input disk using a set of non-circular gears. Co-axial input and output can also be achieved.

14 Claims, 29 Drawing Sheets

(51) Int. Cl.
*F16H 29/18* (2006.01)
*F16H 29/08* (2006.01)
*F16H 29/14* (2006.01)
*F16H 19/04* (2006.01)
*F16H 35/00* (2006.01)

(52) U.S. Cl.
CPC ............. *F16H 29/14* (2013.01); *F16H 29/18* (2013.01); *F16H 2035/003* (2013.01); *Y10T 74/1516* (2015.01)

(58) Field of Classification Search
CPC .. F16H 29/18; F16H 31/005; F16H 2035/003; F16H 37/02; F16H 37/04; F16H 3/00; F16H 19/04; F16H 19/043; F16H 31/00; F16H 31/003; F16H 55/54; F16H 9/10; F16H 2007/0891; B60K 6/543
USPC ... 74/111, 30, 112, 117, 120, 121, 828, 829, 74/831
See application file for complete search history.

(56) References Cited

U.S. PATENT DOCUMENTS

| | | | | |
|---|---|---|---|---|
| 4,850,248 A * | 7/1989 | Korban | ................... | F16H 29/18 74/63 |
| 5,099,706 A * | 3/1992 | Irvin | ................... | F16H 29/20 74/63 |
| 5,239,879 A * | 8/1993 | Economou | ............. | F16H 29/08 74/117 |
| 5,440,945 A * | 8/1995 | Penn | ................... | F16H 29/08 74/117 |
| 5,603,240 A * | 2/1997 | Klovstad | ................ | F16H 29/20 74/120 |
| 5,685,794 A * | 11/1997 | Willmot | .................. | B62M 9/08 74/117 |
| 5,860,320 A * | 1/1999 | Crabb | ..................... | F16H 29/08 74/112 |
| 6,773,368 B1* | 8/2004 | Williames | ............. | B60K 17/16 475/74 |
| 6,849,023 B1* | 2/2005 | Kerr | ....................... | F16H 29/00 74/437 |
| 7,878,935 B2* | 2/2011 | Lahr | ...................... | F16H 29/02 475/185 |
| 8,425,364 B2* | 4/2013 | Lahr | ...................... | F16H 29/04 475/207 |
| 8,534,146 B2* | 9/2013 | Flugrad | .................. | F16H 29/20 74/110 |
| 8,919,464 B2* | 12/2014 | Greenwood | ......... | B62D 11/006 180/6.24 |
| 9,028,350 B2* | 5/2015 | Cho | ......................... | F16H 55/54 474/47 |
| 9,347,531 B2* | 5/2016 | Cho | ......................... | F16H 55/54 |
| 9,506,545 B2* | 11/2016 | Klovstad | ................ | F16H 29/04 |
| 2004/0014548 A1* | 1/2004 | Borbolla Gonzalez | . | F16H 3/423 475/214 |
| 2004/0220012 A1* | 11/2004 | Siman-tov | ............. | F16H 55/54 475/207 |
| 2005/0009661 A1* | 1/2005 | Kerr | ....................... | F16H 29/00 475/203 |
| 2005/0227797 A1* | 10/2005 | Jeng | ....................... | F16H 55/54 474/47 |
| 2010/0064831 A1* | 3/2010 | Lee | .......................... | F16H 3/76 74/22 R |

* cited by examiner

1024

1024

5

2
1025
1025

4

6

52

21

Enlarged view A

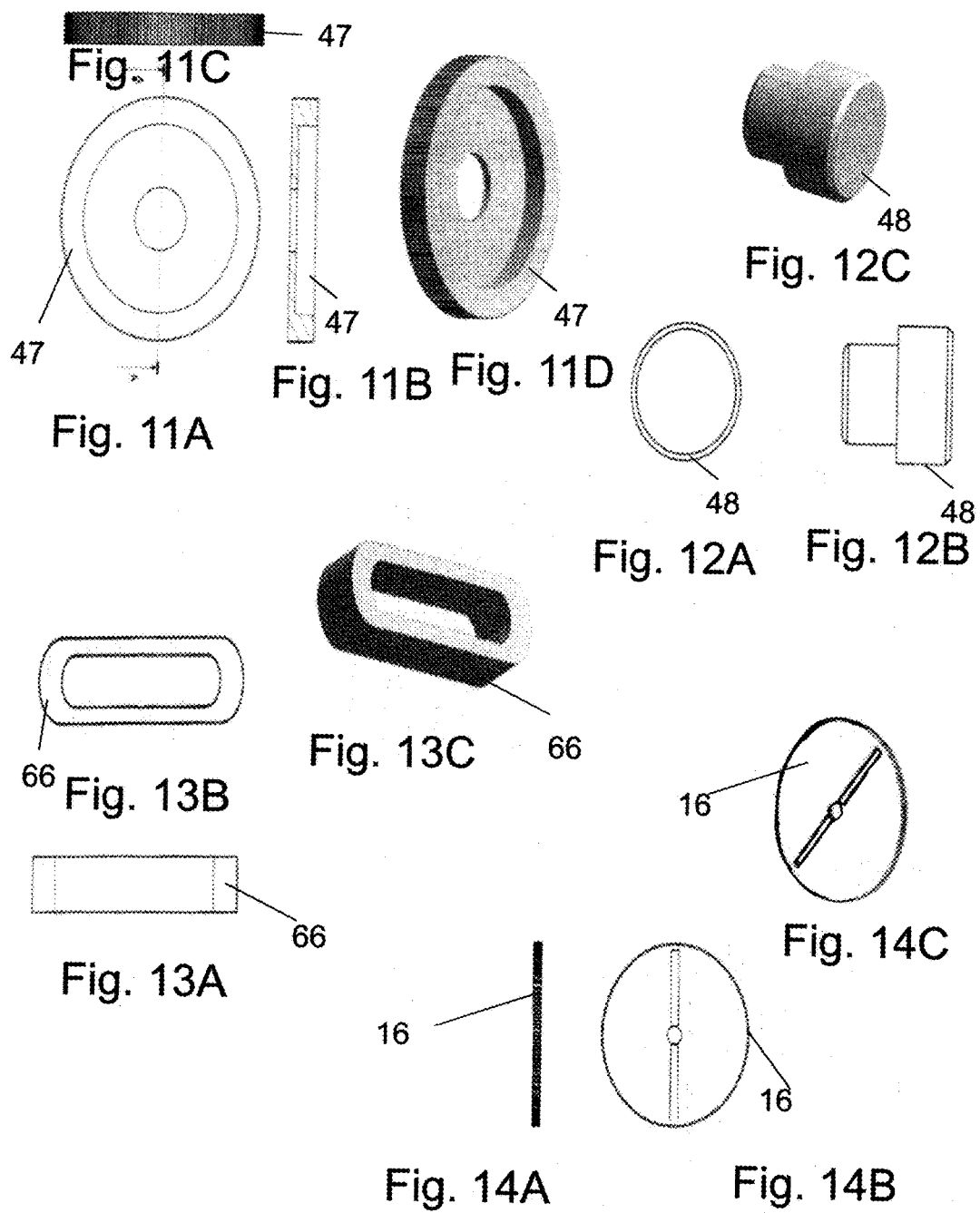

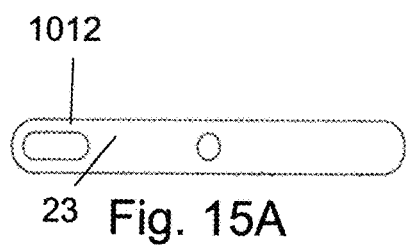
1012
23 Fig. 15A
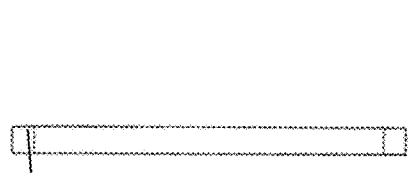
23 Fig. 15B
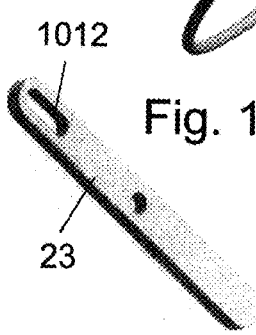
1012
23 Fig. 15C
Fig. 16
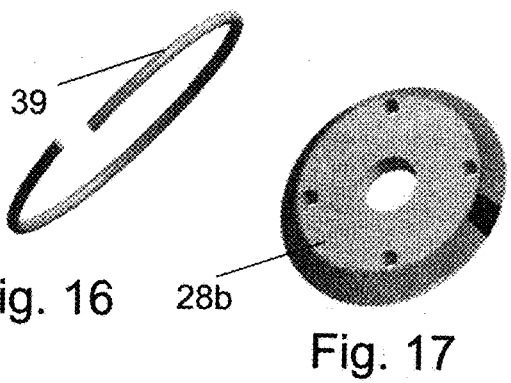
39
28b Fig. 17
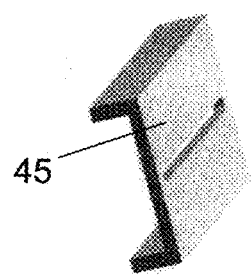
45 Fig. 18C
46 Fig. 19C
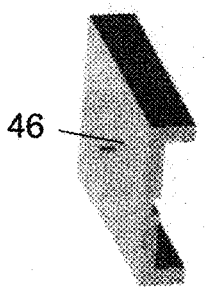
46 Fig. 19D
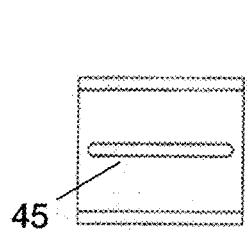
45
45
Fig. 18A  Fig. 18B
45
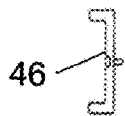
46
Fig. 19A
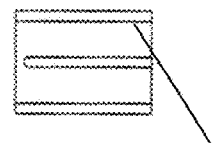
46
Fig. 19B

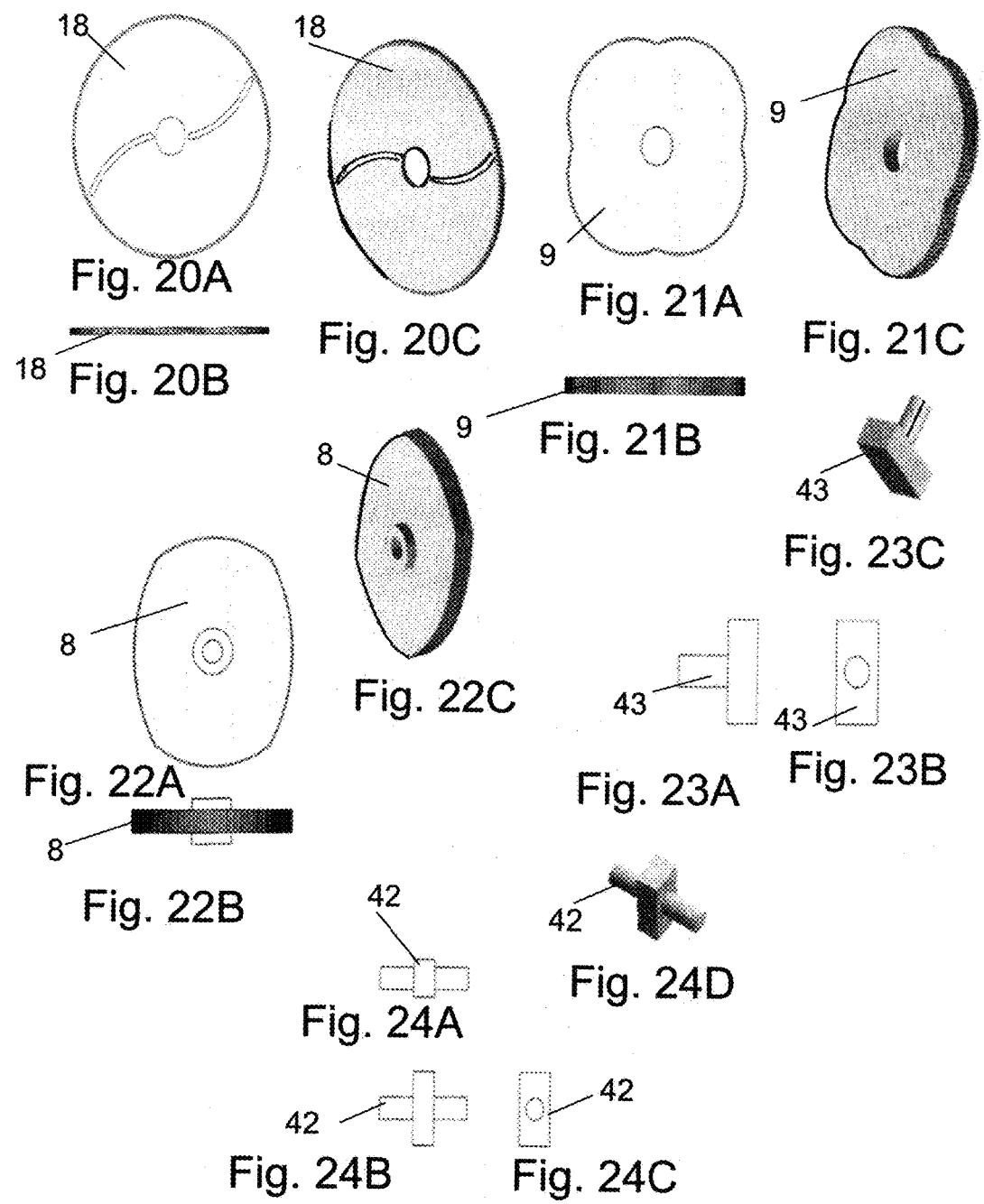

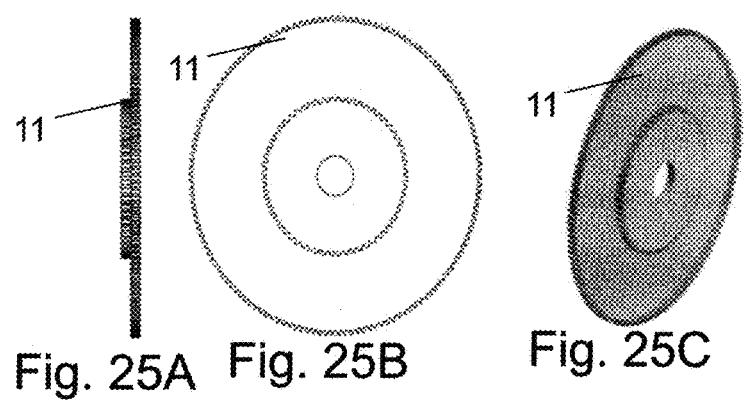
Fig. 25A  Fig. 25B  Fig. 25C
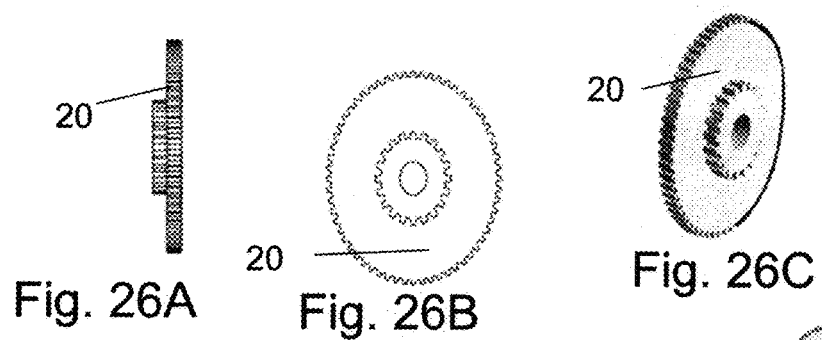
Fig. 26A  Fig. 26B  Fig. 26C
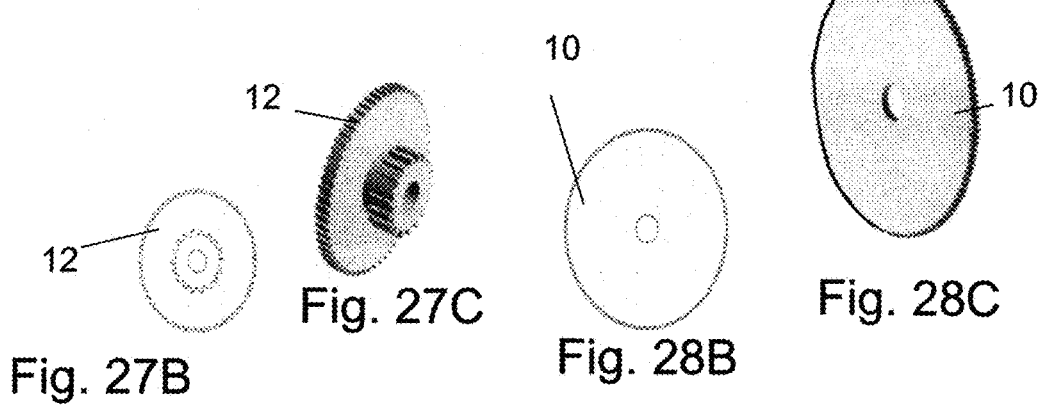
Fig. 27C  Fig. 28B  Fig. 28C
Fig. 27B
Fig. 27A  Fig. 28A

Fig. 29A
Fig. 29B
Fig. 29C
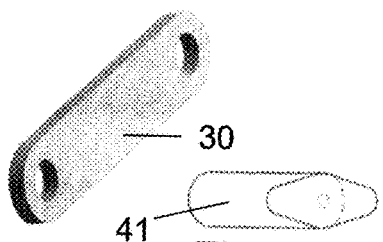
Fig. 30A
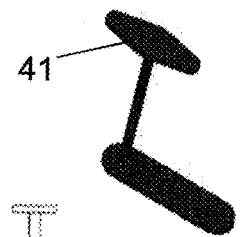
Fig. 30D
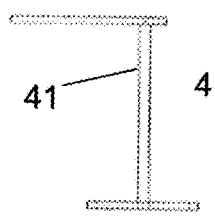
Fig. 30B
Fig. 30C
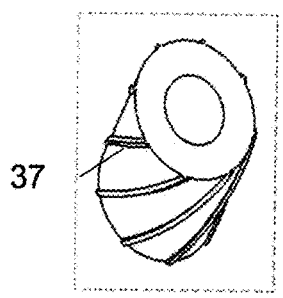
Fig. 31C
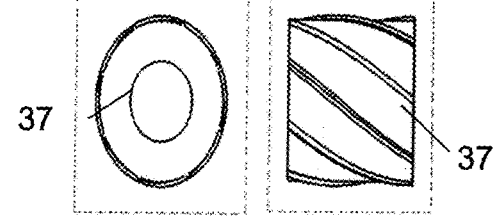
Fig. 31A  Fig. 31B
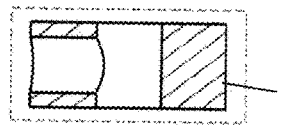
Fig. 32C
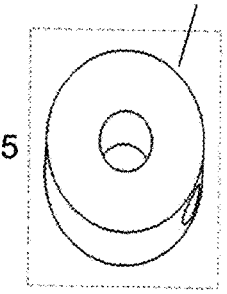
Fig. 32D
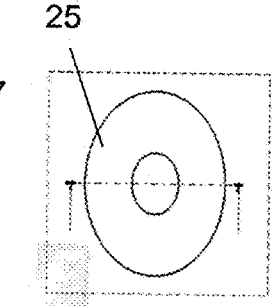
Fig. 32A
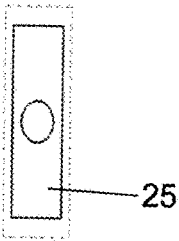
Fig. 32B

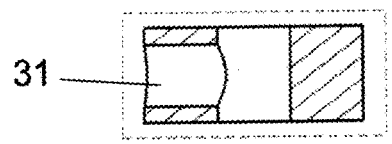
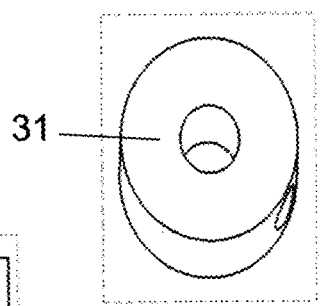
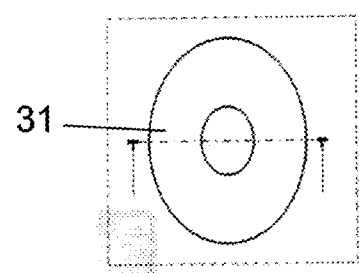
Fig. 33-C
Fig. 33D
Fig. 33-A
Fig. 33-B
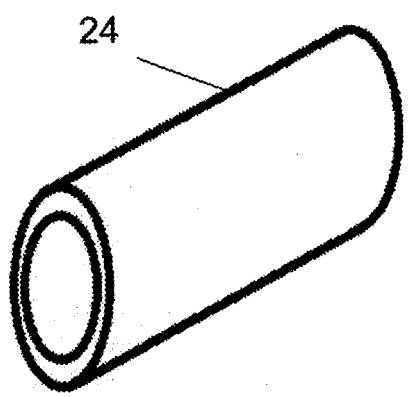
Fig. 34

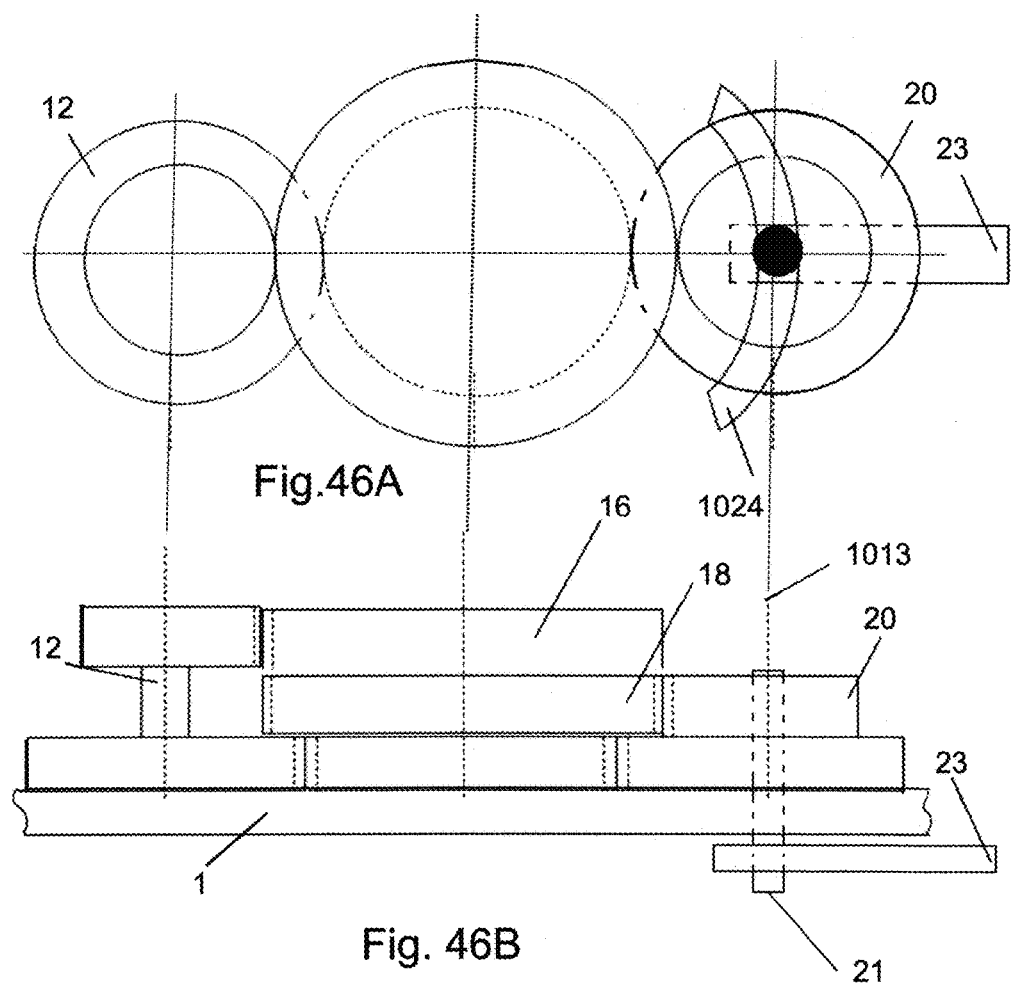

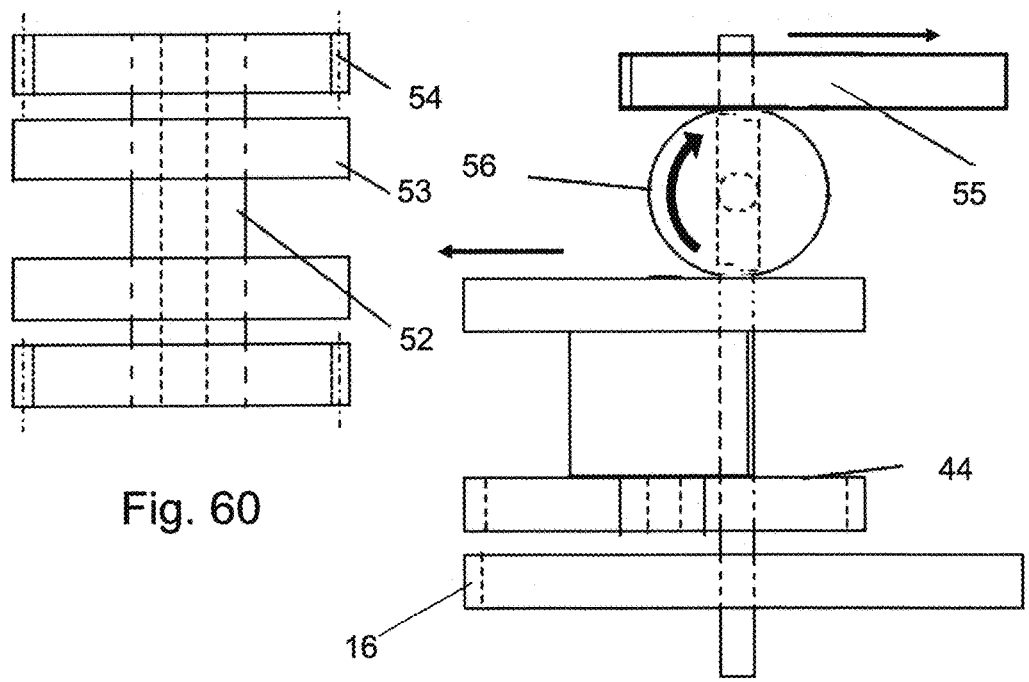
Fig. 60
Fig. 61
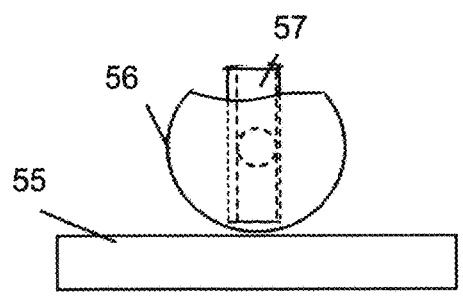
Fig. 62

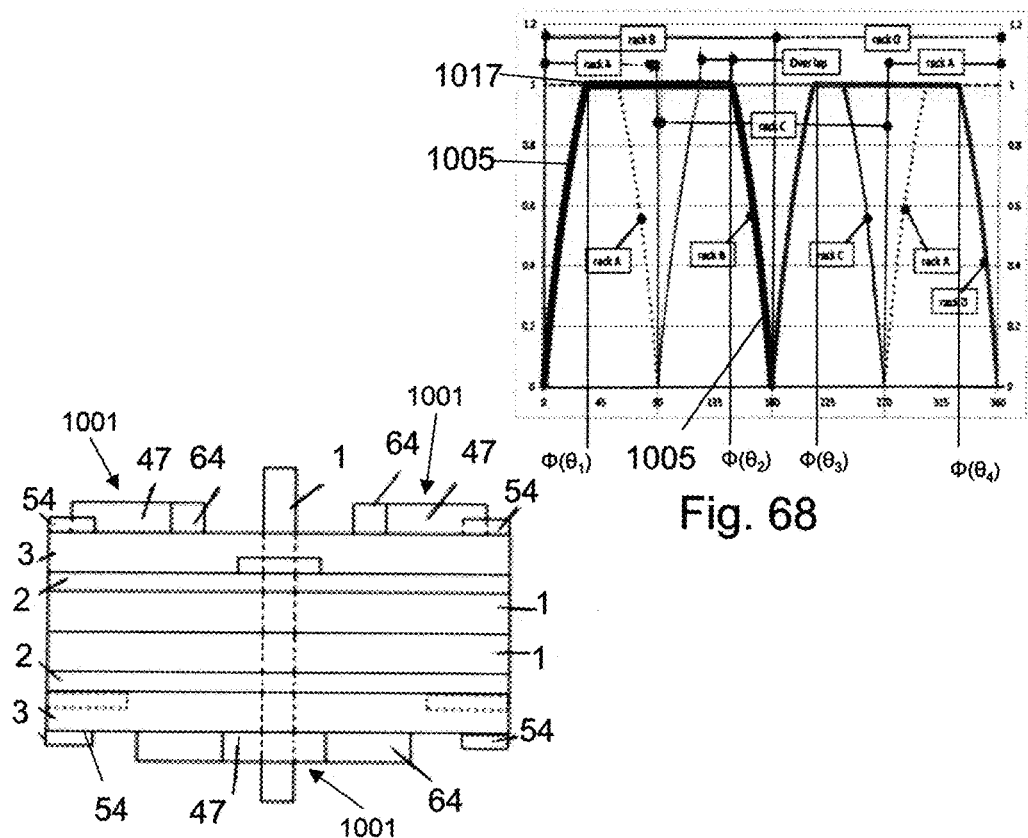
Fig. 68
Fig. 67
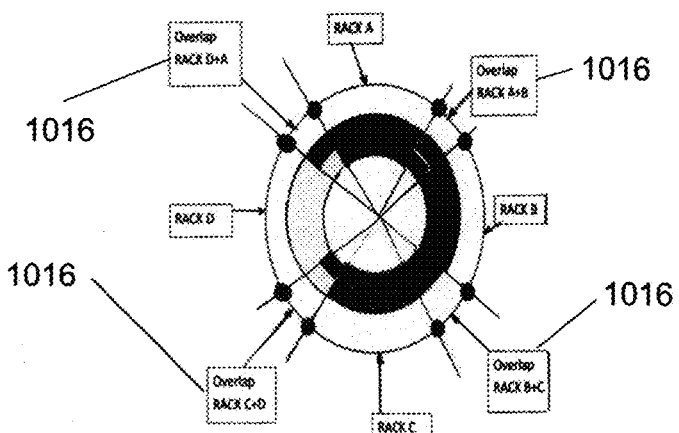
Fig. 69

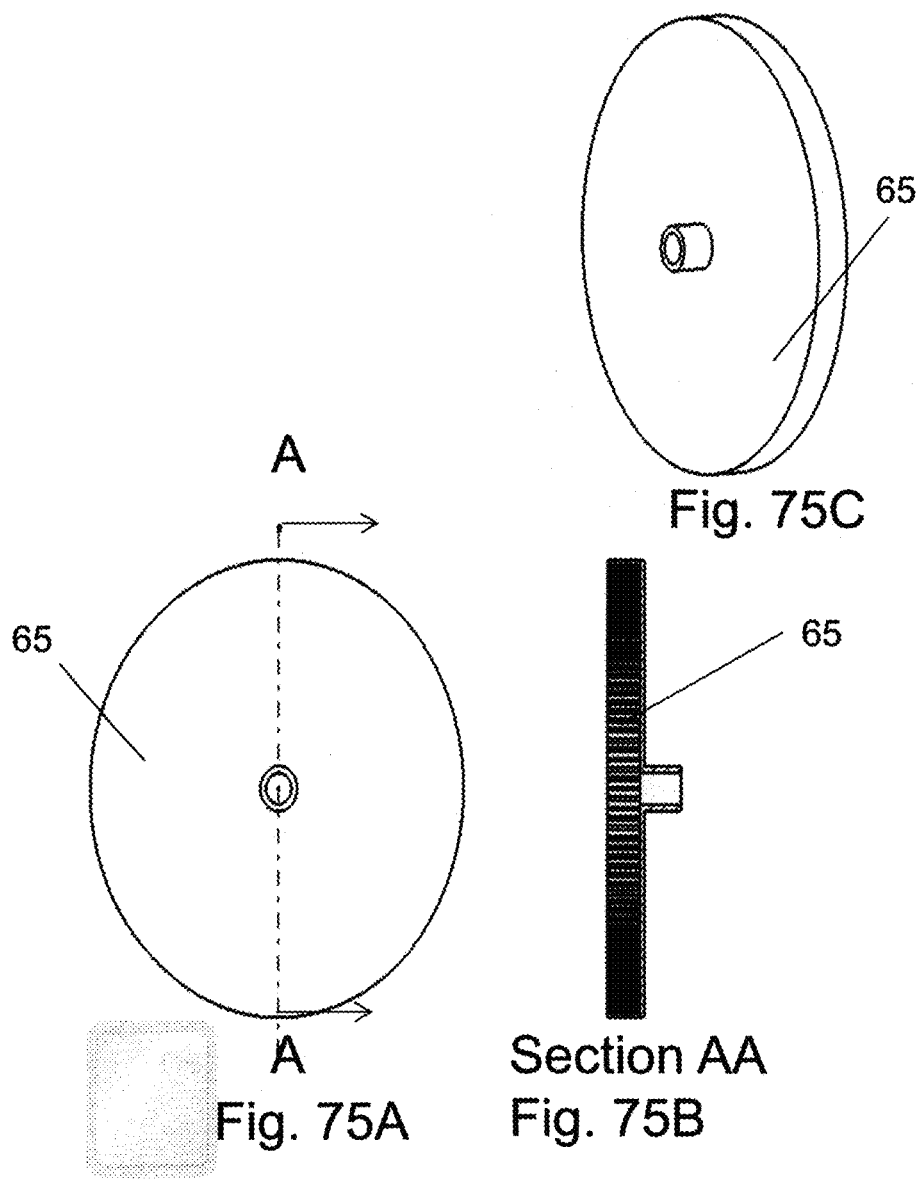

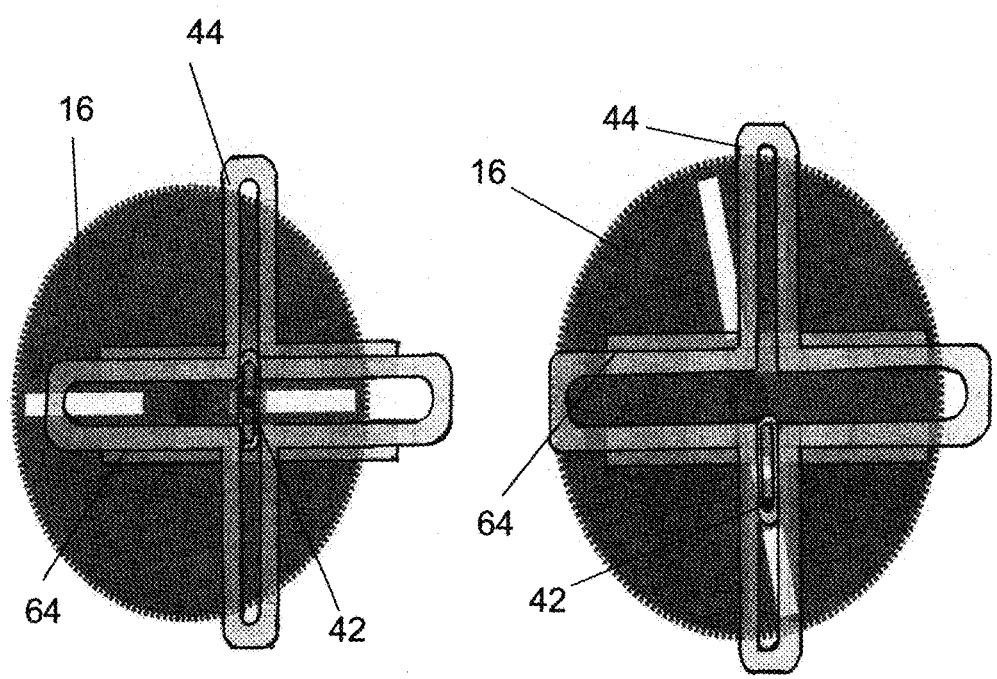

CONTINUOUS VARIABLE TRANSMISSION WITH UNIFORM INPUT-TO-OUTPUT RATIO THAT IS NON-DEPENDENT ON FRICTION

CROSS-REFERENCE TO RELATED APPLICATIONS

This is a national stage application of International PCT Application No. PCT/US2014/031136, titled "Continuous Variable Transmission with Uniform Input-to-Output Ratio that is Non-Dependent on Friction," filed Mar. 18, 2014, which claims priority to U.S. Provisional Application No. 61/788,563, titled "Continuous Variable Transmission," filed Mar. 15, 2013.

FIELD OF THE INVENTION

This invention pertains to transmissions having variable ratios between input and output velocities. Specifically, it relates to all-gear transmissions whose velocity ratios may be changed continuously over a wide range of values, without depending on friction.

BACKGROUND OF THE INVENTION

The U.S. Pat. No. 5,603,240 and US 20100199805 use some of the features used in this design.

The advantages in this invention include:

The U.S. Pat. No. 5,603,240 does not have a co-axial input to output and therefore cannot be used for applications requiring this configuration. The output travels as the ratio is changed. Therefore, this design cannot be used when stationary output is required. The new invention offers a stationary and co-axial input and output shaft. The envelope used in this prior art is comparably larger.

US 20100199805 offers a sinusoidal output and uses several modules just to minimize the "ripple" when a steady and uniform input is provided. Therefore, this design cannot be used when a steady and uniform output is desired. The new invention offers a steady and uniform output when the input is steady and uniform. This can be achieved with as low as three modules.

BRIEF SUMMARY OF THE INVENTION

The main object of this invention is to provide a UNIFORM and STEADY output, when the input is uniform and steady, with the ability to transmit high torque without depending on friction or friction factor. Many of the continuously variable transmissions that are in the market today are friction dependent and therefor lack the ability to transmit high torque. Those continuously variable transmissions, which are non-friction dependent do not have a uniform and steady output when the input is uniform and steady. This design aids reduction in the overall size and can be economically mass produced. This design can be easily integrated into any system. This design is very versatile and can be used ranging from light duty to heavy duty applications. This design allows replacement of existing regular transmission, requiring very little modification. This design offers stationary and co-axial input and output.

BRIEF DESCRIPTION OF THE SEVERAL VIEWS OF THE DRAWINGS

FIG. 11—Pinion:
  A—Front view
  B—Side view
  C—Top view
  D—Perspective view
FIG. 12—Pinion Shaft:
  A—Front view
  B—Side view
  C—Perspective view
FIG. 13—Slider Guide:
  A—Front view
  B—Side view
  C—Perspective view
FIG. 14—Input Disk:
  A—Front view
  B—Side view
  C—Perspective view
FIG. 15—Gear Changing Lever—Planetary mechanism:
  A—Front view
  B—Top view
  C—Perspective view
FIG. 16—Compression Spring—Perspective view.
FIG. 17—Stationary differential collar large bevel gear—Perspective view.
FIG. 18—Primary Telescopic Sleeve:
  A—Front view
  B—Side view
  C—Perspective view
FIG. 19—Secondary Telescopic Sleeve:
  A—Front view
  B—Side view
  C—Top view
  D—Perspective view FIG. 20—Ratio Cam:
A—Front view
B—Top view
C—Perspective view
FIG. 21—Non-circular Gear (Driven):
A—Top view
B—Front view
C—Perspective view
FIG. 22—Non-circular Gear (Driving):
A—Top view
B—Front view
C—Perspective view
FIG. 23—Dummy Crank Pin:
A—Top view
B—Front view
C—Perspective view
FIG. 24—Crank Pin:
A—Top view
B—Front view
C—Side view
D—Perspective view
FIG. 25—Intermediate Circular Gear C2-C3:
A—Front view
B—Side view
C—Perspective view
FIG. 26—Carrier Gear C4a-C5b:
A—Front view
B—Side view
C—Perspective view
FIG. 27—Intermediate Circular Gear C4-C5:
A—Front view
B—Side view
C—Perspective view.
FIG. 28—Intermediate Circular Gear C1:
A—Front view
B—Side view
C—Perspective view
FIG. 29—Spacer:
A—Front view
B—Top view
C—Perspective view
FIG. 30—Gear Changing Lever for Spiral flute mechanism:
A—Front view
B—Side view
C—Top view
D—Perspective view
FIG. 31—Spiral Flute Collar:
A—Front view
B—Side view
C—Perspective view
FIG. 32—Stationary Differential Collar:
A—Front view
B—Side view
C—Section view
D—Perspective view
FIG. 33—Dynamic Differential Collar:
A—Front view
B—Side view
C—Section view
D—Perspective view
FIG. 34—Sleeve-Input-Bevel perspective view
FIG. 35 thru 43—Views showing the movement/position on rack assembly, crank pin as input disk rotates: shown at various stages:

FIG. 50—Differential Mechanism (partially sectioned) view 1.
FIG. 51—Differential Mechanism (partially sectioned) view 2.
FIG. 52—Differential Mechanism (partially sectioned) view 3.
FIG. 53—Differential Mechanism (partially sectioned) view 4.
FIG. 54—Differential Mechanism (partially sectioned) view 5.
FIG. 55—Differential Mechanism (partially sectioned) view 6.
FIG. 60—Power link Assembly.
FIG. 61—Assembly showing concept of vibration cancelation.
FIG. 62—Vibration Cancelation Mechanism: sub-assembly.
FIG. 63 non-circular gear placed at 135°

FIG. 64 non-circular gear placed at 45°
FIG. 65 non-circular gear placed at (−45°)
FIG. 66 non-circular gear placed at (−135°)
FIG. 67 thru 69—Details showing how constant and uniform output is achieved:
FIG. 67—Complete CVT Assembly showing the orientation of modules and orientation of racks and explaining how 4 modules are placed.
FIG. 68—Graph showing individual output at each rack (absolute velocity) and combined total output showing constant and uniform output with overlaps 1016. Horizontal axis shows the angle of rotation of the non-circular gear (driven). Vertical axis shows the rack speed. Figure also shows that the rack moves at a constant velocity during the functional region and decelerates to a stop, and accelerates (in the reverse direction) to constant velocity in the non-functional region.
FIG. 69—Graphical representation of output with overlaps 1016 and sequence of engagement for a complete cycle. Figure shows the overlap 1016 of the functional regions between consecutive modules
FIG. 70 thru 73—Miter/bevel gear assembly describing forward, reverse, neutral and park gears:
FIG. 77 thru 78—Assembly of input disk, Cross-Rack assembly, crank pin and crank pin retainer to show the concept behind function of crank pin retainer.
FIG. 77 Crank pin and the crank pin retainer when they are in the middle of input slot.
FIG. 78—Crank pin and the crank pin retainer as it exits the input slot.

DETAILED DESCRIPTION OF THE INVENTION

Summary of the Invention

To briefly describe this invention is a Continuously Variable Transmission (CVT). Unlike existing CVT designs, this particular design does not depend on friction to transmit power. Most of the CVTs that exist today depend on friction to transmit power and thereby cannot be used where there is a need to transmit high power at low speed. Due to this advantage, it is possible to use this invention where high torque transmission is required. Co-axial input and output can be achieved with this layout.

Figure 1:
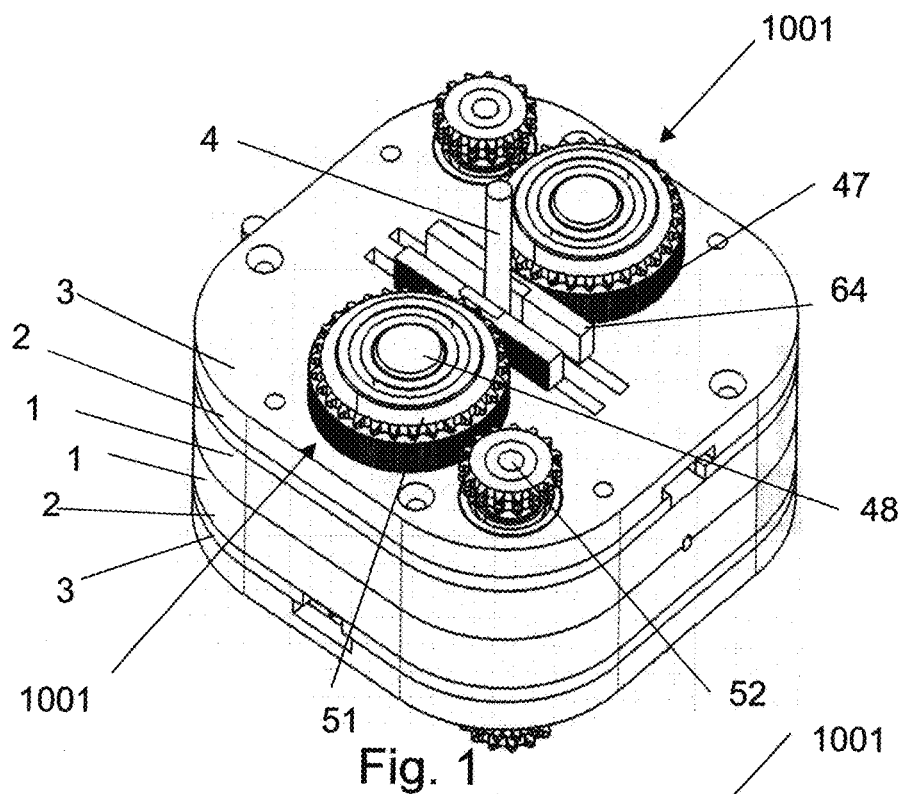
FIG. 1—CVT general assembly perspective view.
Figure 2:
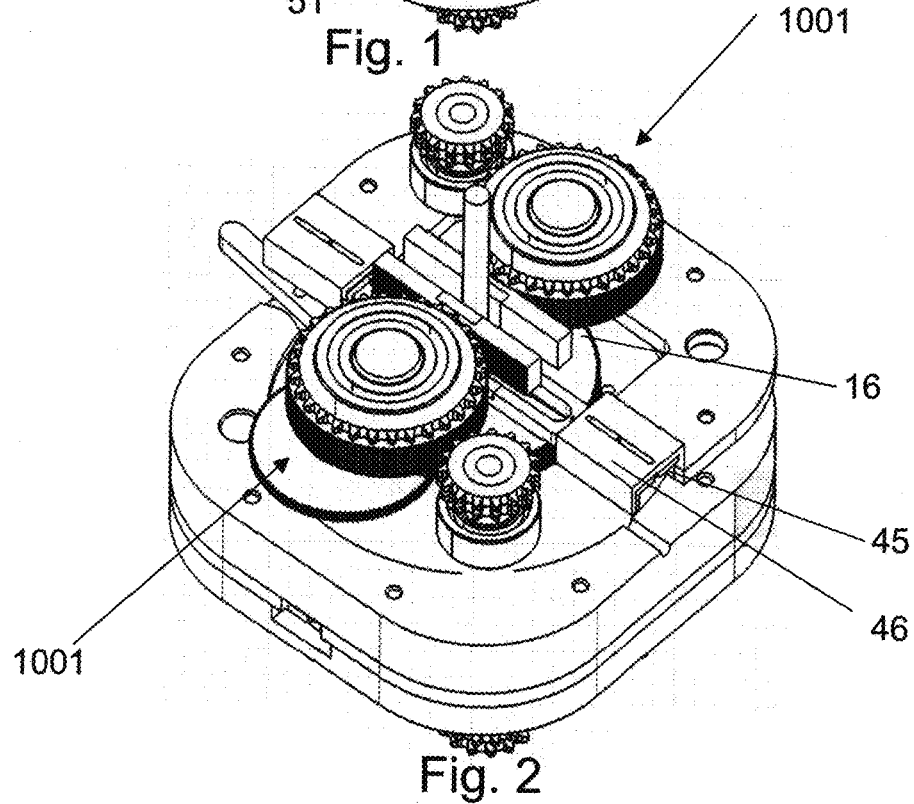
FIG. 2—CVT general assembly perspective view with frames made transparent showing general arrangement of internal sub-assemblies.
Figure 10A:
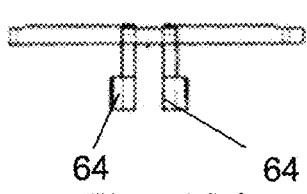
FIG. 10—Cross-Rack Assembly showing two perspective views and orthographic views showing details of the input shaft slot and the crank pin slot, orientation of the racks and details of the prongs:
  A—Top view
  B—Perspective view 1
  C—Perspective view 2
  D—Front view
  E—Side view
  F—Rear view
  G—Enlarged view showing details of the prong.
Figure 10B:
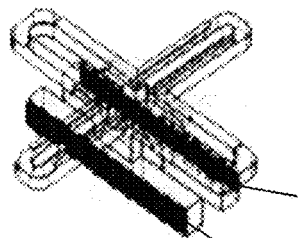
Figure 10C:
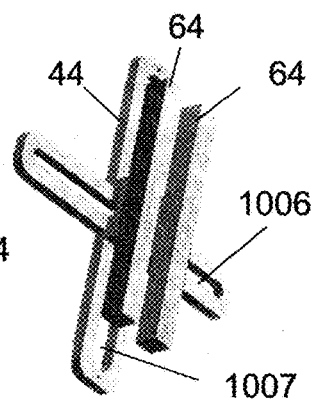
Figure 10D:
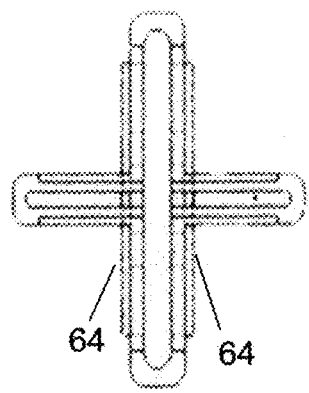
Figure 10E:
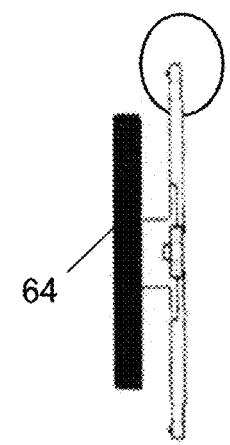
Figure 10G:
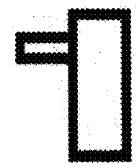
Figure 10F:
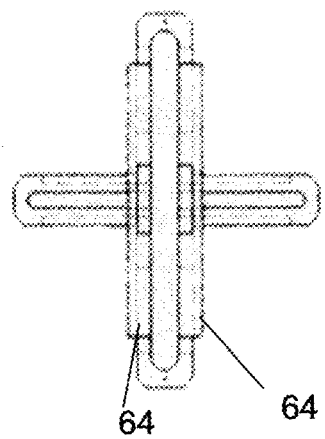
Figure 35:
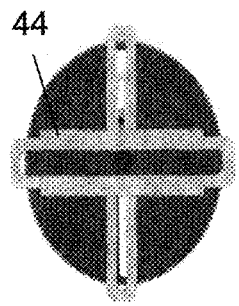
FIG. 35—Crank pin closer to the axis and input disk at 0°
FIG. 36—Crank pin closer to the axis and input disk at 45°
FIG. 37—Crank pin closer to the axis and input disk at 90°
FIG. 38—Crank pin at midpoint and input disk at 0°
FIG. 39—Crank pin at midpoint and input disk at 45°
FIG. 40—Crank pin at midpoint and input disk at 90°
FIG. 41—Crank pin farthest from the gear and input disk at 0°
FIG. 42—Crank pin farthest from the gear and input disk at 45°
FIG. 43—Crank pin farthest from the gear and input disk at 90°
FIG. 44—Perspective view showing Input Modification. Details showing arrangements and gear train of non-circular gears and intermediate circular gears from input shaft to input disk.

The working of this CVT can be described by the following simple sequential operations.

a) A crank pin 42 revolves around the axis of an input disk 16 at an offset distance, and this offset distance can be altered. The concept described in this operation exists in another patent US 20100199805. However, here an entirely different approach is adapted on how this concept is used, how the offset is altered etc. in a much simpler, and compact envelop.

b) This offset crank pin 42 is caged in a slot 1006 of a cross-rack assembly 44 normal to the longitudinal axis of the rack 64 as shown in FIG. 10C. The cross-rack assembly 44 is restricted such that the rack 64 can move only in the direction parallel to the longitudinal axis of the rack 64. The rotational movement of the crank pin 42 is translated to pure linear back and forth movement of the rack 64. This mechanism is commonly known as "scotch yoke mechanism" in the industry. The Shaft-Input 4, which has only rotation and no translation, passes through the cross-rack assembly 44. Since there is relative motion between the Shaft-Input 4 and the cross-rack assembly 44, another slot 1007 parallel to the longitudinal axis of the rack 64 is used so that the Shaft-Input 4 does not restrict movement of the cross-rack assembly 44. The distance of this linear back and forth movement (stroke) is directly proportional to the radial distance of the crank pin 42 from the axis 1021 referenced in FIGS. 45A & 45B of the input disk 16.

c) The rack 64 is linked to a pinion 47 as shown in FIG. 1 converting this linear movement of the rack 64 to rocking oscillation of the pinion 47.

d) This rocking oscillation movement is converted to a unidirectional rotation, using a 50) One-way bearing/computer controlled clutch/ratchet mechanism 50.

One main purpose of this invention is to achieve a constant and uniform output angular velocity when the input angular velocity is constant and uniform. However, using the steps described above, this is not achieved, as the output is sinusoidal. By modifying the rate of change of angular displacement of the input disk 16, uniform steady output can be achieved. By using a set of non-circular gears, the driving and the driven shown in FIG. 22 and FIG. 21 respectively, the rate of change in angular displacement at the input disk 16 can be altered. The driving non-circular gear 8 and the driven non-circular gear 9 have "functional region" 1017 and "non-functional region" 1005. When the functional region of the driving non-circular gear 8 and the driven non-circular gear 9 are in contact the rack 64 moves at a constant velocity and when the non-functional region of the driving non-circular gear 8 and the driven non-circular gear 9 are in contact the rack 64 decelarates to a stop and accelarates to the constant velocity in the opposite direction. The output from the driven non-circular gear 9 is then transferred to the input disk 16 via some intermediate circular gears.

The profile of the driving non-circular gear 8, when radius "r" is expressed as a function of θ, is given by the equation $$r_{v1}(\theta) = \frac{R*K*CTR}{R*K + f(\theta)},$$

where "K" is a constant which depends on radii of all intermediate circular gears and "R" is the desired ratio between rate of change in angular displacement of the input at the driving non-circular gear 8 and the output at the input disk 16.

The ideal value for "R" is generally 1. "K" is derived from the radii of the intermediate circular gears and it is equal to the product of the radii of the driven gears divided by the product of the radii of the driving gears. The ideal value for "K" is generally 1. "CTR" is the center-to-center distance of the two non-circular gears 8&9. This is chosen based on the available envelop for the assembly.

f(θ) can be either sin θ or cos θ. Both the formulae will yield identical and interchangeable profile, except they are rotated 90°.

The profile of the driven non-circular gear 9 is given by the formula $$r_{v2}(\theta) = CTR - \frac{R*K*CTR}{R*K+f(\theta)}.$$

The derivation of these profile shapes and the parameters used are explained in detail in subsequent topics.

To aid in comprehending the invention a CAD model is designed, created, and explained below.

The features used here are:
The chosen value for "R" is 1.
The chosen value for "K" is 1.

Figure 6:
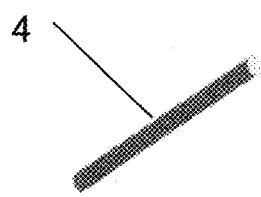
FIG. 6—Input Shaft perspective view.
Figure 7:
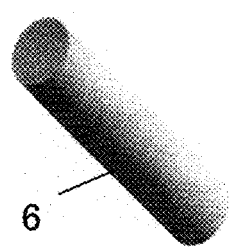
FIG. 7—Intermediate circular gear Shaft perspective view.
Figure 8:
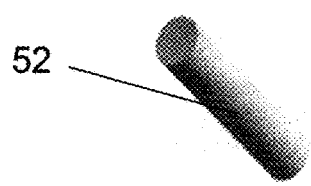
FIG. 8—Power Link Shaft perspective view.
Figure 9:
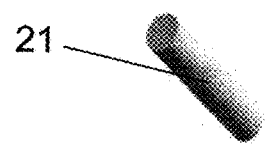
FIG. 9—Carrier Shaft perspective view.

A common Shaft-Input 4 shown in FIG. 6 and a driving non-circular gear 8 are used for all the modules 1001 as shown in FIG. 67.

A common cross-rack assembly 44, input disk 16, driven non-circular gear 9, intermediate circular gears, crank pin 42, ratio cam 18, and ratio changing mechanism is used for two modules 1001.

Two racks 64 are placed on the cross-rack assembly 44 with a phase shift of 180°

Another identical assembly of modules is placed such that the second module is a lateral inversion of the first module 1001 and rotated by 90°.

LIST OF COMPONENTS

Figure 3A:
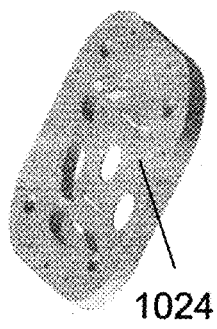
FIG. 3—Frame-Main Housing—Two identical parts are bolted together to form one main housing:
  A. Perspective view showing details on one side of the main housing.
  B. Perspective view showing details on the other side of the main housing.
Figure 3B:
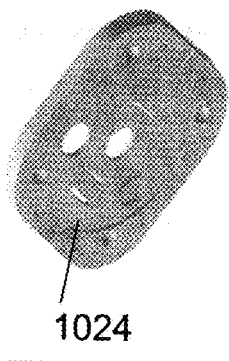
Figure 4:
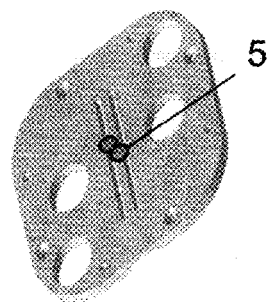
FIG. 4—Frame-Telescopic Sleeve Guide perspective view.
Figure 5:
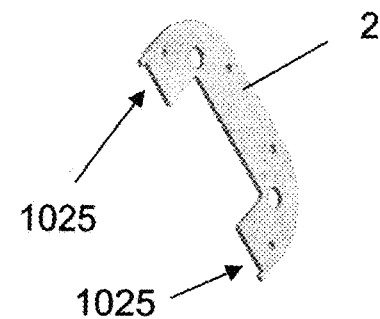
FIG. 5—Frame-Cross-Rack Guide perspective view.

1) Frame-Main-Housing
2) Frame-Cross-Rack-Guide
3) Frame-Telescopic-Guide
4) Shaft-Input
5) Bearing-Input-Shaft
6) Intermediate-Gear-Shaft
7) Intermediate-Gear-Shaft-Bearing
8) Driving Non-circular gear
9) Driven Non-circular gear
10) Intermediate circular gear C1
11) Intermediate circular gears C2-C3
12) Intermediate circular gears C4-C5
13) Bearing-collar (stationary and dynamic)
14) Bearing-circular gear C2-C3
15) Bearing-circular gear C4-C5
16) Input disk
17) Bearing-input disk
18) Ratio cam plate
19) Bearing-ratio cam
20) Intermediate carrier circular gears C4a-C5a
21) Carrier shaft
22) Bearing-carrier shaft
23) Ratio-changing-lever-planetary-mechanism
24) Sleeve-Input disk-bevel
25) Stationary differential collar
26) Stationary differential collar spur shaft bearing
27) Stationary differential collar spur gear shaft
28) a) Stationary differential collar small bevel gear
   b) Stationary differential collar large bevel gear
29) Stationary differential collar spur gear
30) Spacer
31) Dynamic differential collar
32) Dynamic differential collar spur shaft bearing
33) Dynamic differential collar spur gear shaft
34) a) Dynamic differential collar small bevel gear
   b) Dynamic differential collar large bevel gear
35) Dynamic differential collar spur gear
36) Universal joint
37) Spiral fluted input disk collar
38) Bearing-Co-axial output element
39) Compression spring
40) Thrust bearing
41) Ratio-changing-lever-spiral-flute-mechanism
42) Crank pin
43) Dummy crank pin
44) Cross-Rack assembly
45) Primary telescopic sleeve
46) Secondary telescopic sleeve
47) Pinion
48) Pinion shaft
49) Pinion bearing
50) One-way bearing/computer controlled clutch/ratchet mechanism
51) Output Sprocket/Gear
52) Power link shaft
53) Power link shaft bearing
54) Power link Sprocket/Gear
55) Dummy rack
56) Wheel-vibration cancellation
57) Collar-wheel-vibration cancellation
58) Input shaft for miter bevel gears
59) Output Miter bevel gear
60) Clutch-park/neutral/reverse
61) Shaft-Output
62) Intermediate circular gear-non-circular gear connector
63) Guide-intermediate circular gear-non-circular gear connector
64) Rack
65) Co-axial output element with internal gear
66) Slider Guide
67) Dynamic small bevel gear shaft
68) Stationary small bevel gear shaft Description of Assembly, Sub-Assembly of Components and their Functions:

Description of the General Construction:

The Shaft-Input 4 is mounted on two Bearing-Input-Shaft 5 and placed in the center of the Frame-Main-housing(s) 1 shown in FIG. 3. The input disk 16 is mounted on the Shaft-Input 4 and sandwiched between the cross-rack assembly 44 and the ratio cam 18 and the crank pin 42 is caged in the slot 1006, The crank pin 42 has a body shaped like rectangular prism with circular prism extended on both sides. One of them functions as a cam-follower, made to engage with the ratio cam plate 18 and other functions as a crank pin 42, and made to engage with the rack 64 on the Cross-Rack assembly 44. Parallel to the input disk 16 the driving non-circular gear 8 is mounted on the Shaft-Input 4.

The Intermediate-Gear-Shaft 6 is mounted on two constant Intermediate-Gear-Shaft-Bearing 7, with one in each of the Frame-Main-housing 1. The Intermediate-Gear-Shaft 6 is placed parallel to the Shaft-Input 4 at a distance "CTR" that is used to derive the shape of the non-circular gears. The powertrain flow from the Shaft-Input 4 to the input disk 16 is as per the table provided below.

| From | To | Type of connection |
| --- | --- | --- |
| Input shaft | Non-Circular Gear-Driving | Axial, Rigid |
| Non-Circular Gear-Driving | Non-Circular Gear-Driven | Radial |
| Non-Circular Gear-Driven | Intermediate circular gear C1 | Axial, Rigid |
| Intermediate circular gear 1 | Intermediate circular gear C2 | Radial |
| Intermediate circular gear 2 | Intermediate circular gear C3 | Axial, Rigid |
| Intermediate circular gear 3 | Intermediate circular gear C4 | Radial |
| Intermediate circular gear 4 | Intermediate circular gear C5 | Axial, Rigid |
| Intermediate circular gear 5 | Input disk | Radial |

The driving non-circular gear 8 and the intermediate circular gears C2-C3 11 are mounted on the Shaft-Input 4. The driven non-circular gear 9, the intermediate circular gear C1 10 and intermediate circular gears C4-C5 12 are mounted on the constant Intermediate-Gear-Shaft 6. The driving non-circular gear 8 is directly mounted on the Shaft-Input 4, and the driven non-circular gear 9 along with the intermediate circular gear-C1 10 are mounted directly on the Intermediate-Gear-Shaft 6. The others are placed in a bearing and mounted on their respective shafts.

The cross-rack assembly 44 is free to move only along the direction of the rack 64 and its movement is restricted by the Frame-Cross-rack-guide 2. A set of telescopic-sleeves, primary 45 and secondary 46 are placed on either side of the cross-rack assembly 44. This will decrease the overall size needed for the cross-rack assembly 44 and the Frame-Main-housing 1. A prong placed on either side of the cross-rack assembly 44 and another on the secondary telescopic sleeve 46, to pull and extend the telescopic sleeves and the telescopic sleeves are collapsed by the body of the cross-rack assembly 44. These telescopic-sleeves are caged-in by the Frame-Telescopic-Guide 3.

Figure 59:
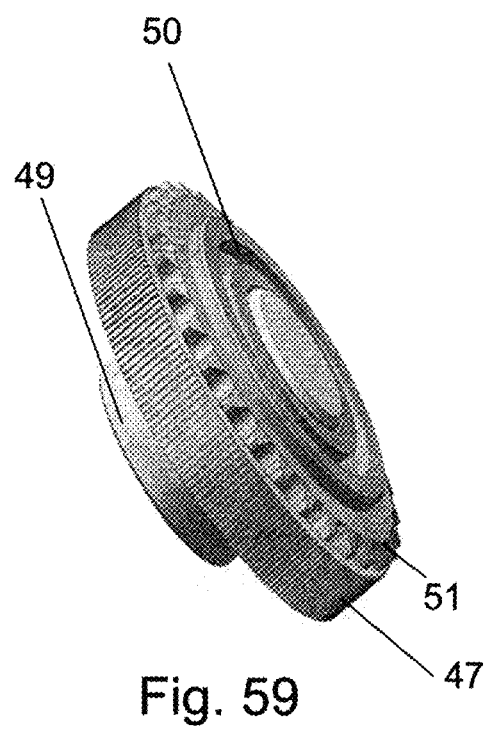
FIG. 59—One-way bearing assembly.
Figure 63:
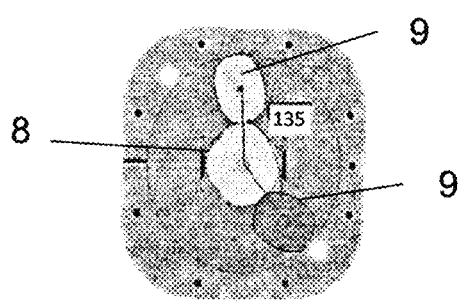
FIG. 63 thru 66—Options of placement of non-circular gears, when a common non-circular driving gear is used with two non-circular driven gears.
Figure 65:
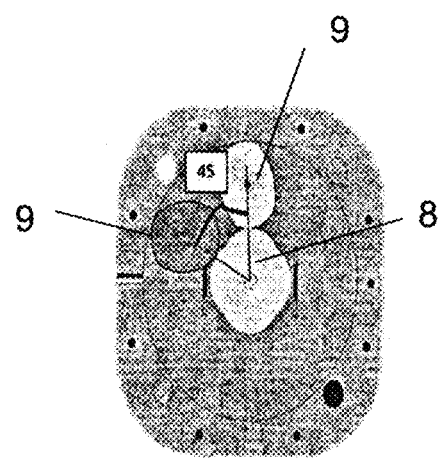
Figure 64:
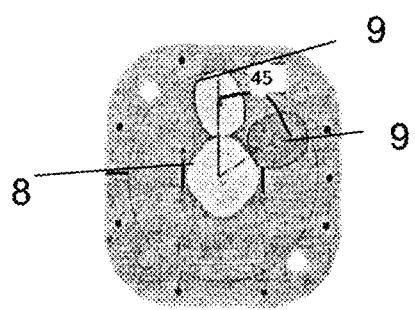
Figure 66:
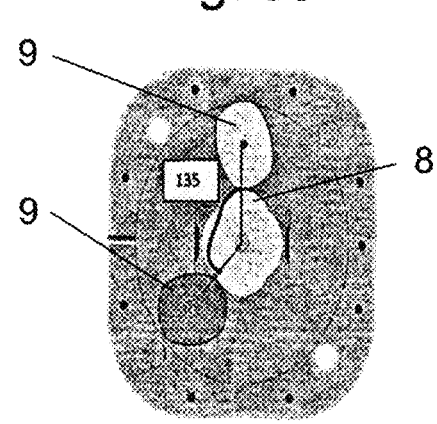
Figure 70:
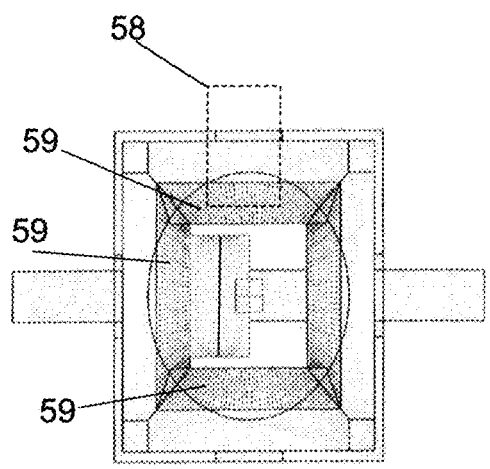
FIG. 70—Engagement of clutches for a Forward gear.
Figure 71:
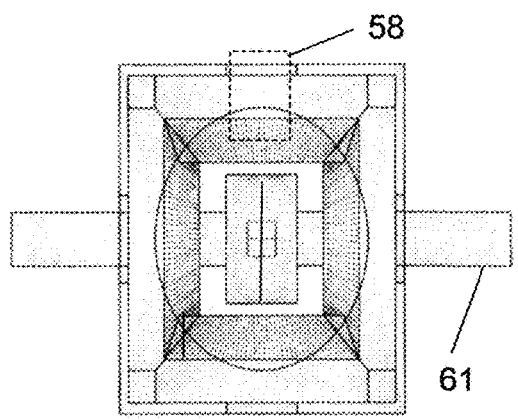
FIG. 71—Engagement of clutches for a Reverse gear.
Figure 72:
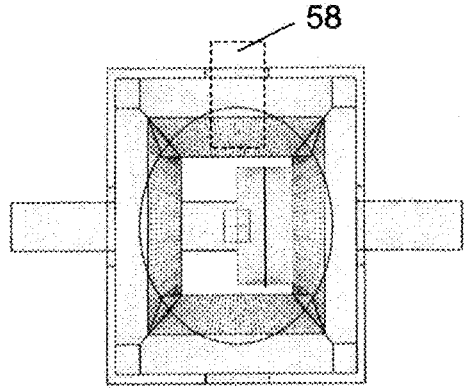
FIG. 72—Engagement of clutches for a Neutral gear.
Figure 73:
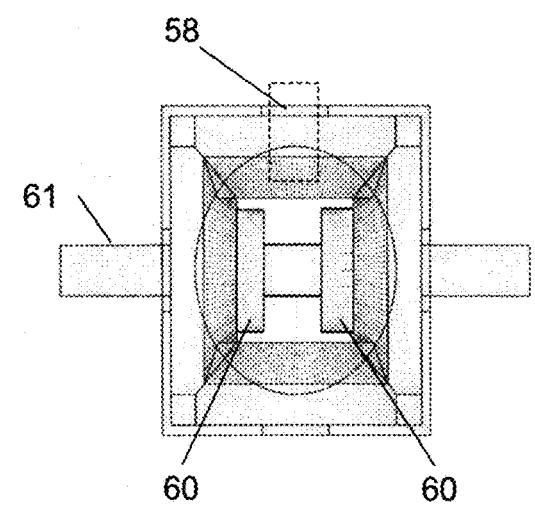
FIG. 73—Engagement of clutches for "Park".
Figure 74A:
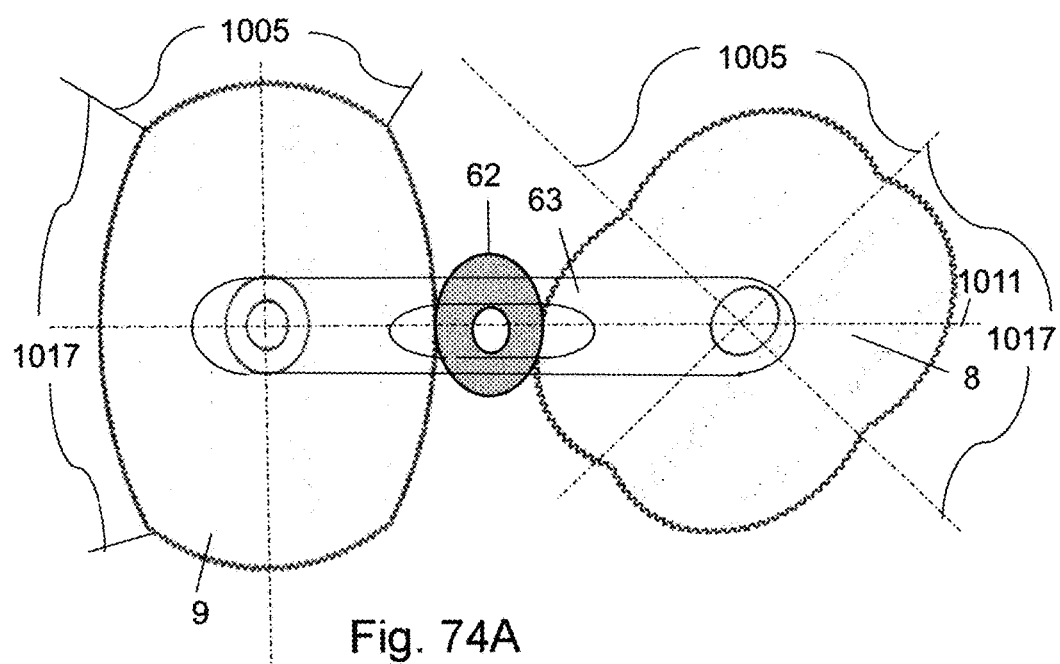
FIG. 74—Concept of using of intermediate circular gear to eliminate multiple contacts between non-circular gears:
A—Top view
B—Front view
FIG. 75—Co-axial output element with internal gears:
A—Front view
B—Section side view
C—Perspective view
FIG. 76—Detail showing arrangement of co-axial output member in the assembly.
Figure 74B:
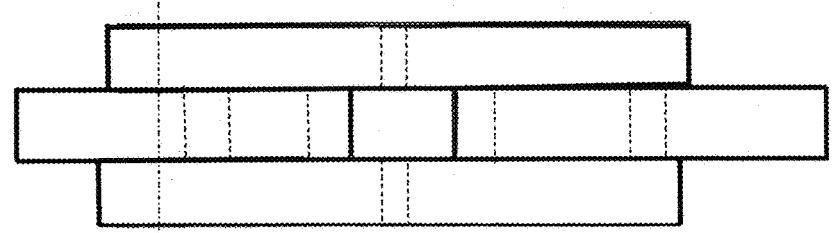
Figure 76:
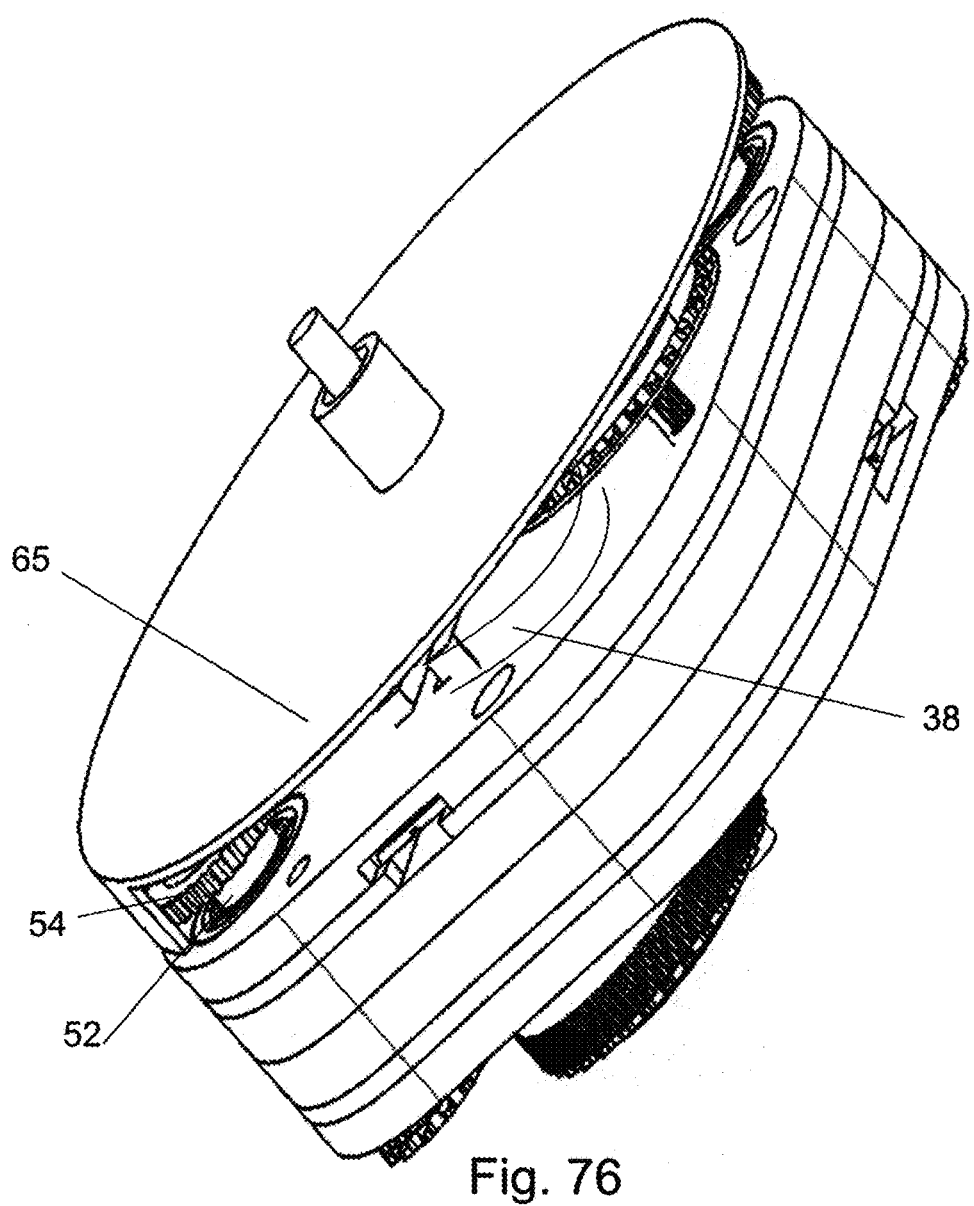

The rack 64 is coupled with a one-way bearing assembly shown in FIG. 59 that consists of a pinion 47 that is placed on a pinion shaft 48. This pinion shaft 48 is mounted on the Frame-Telescopic-Guide 3 with a pinion bearing 49. An Output Sprocket/Gear 51 is mounted on this pinion shaft 48 through a one-way-bearing/computer controlled clutch/ratchet mechanism 50 and is placed coaxial to the pinion 47. A power link shaft assembly shown in FIG. 60 is placed parallel to the one-way bearing assembly shown in FIG. 59. The power link shaft assembly consists of a power link shaft 52 that is mounted on two Power link shaft bearings 53 that are placed on the Frame-Telescopic-Guide 3. A Power link Sprocket/Gear 54 is placed on the power link shaft's 52 each end. The power from the pinion shaft 48 is transmitted to the power link shaft assembly through this gear or sprocket.

Figures 45A, 45B:
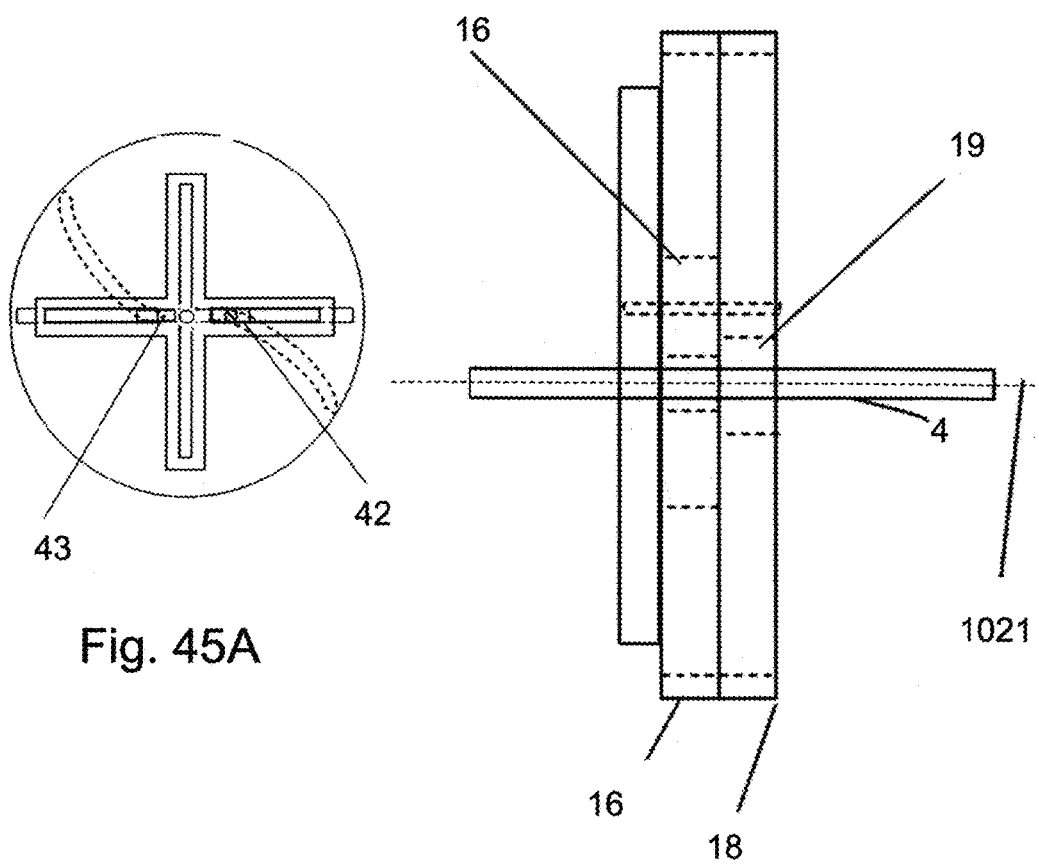
FIG. 45—Ratio cam, input disk and crankpin showing operation behind how the cam alters the pin location
A—Top View
B—Side View
FIG. 46 Views showing working of control mechanism-planetary mechanism:
A—Top View
B—Side View
FIG. 47—Side view showing planetary mechanism showing the longitudinal axis of the common carrier 1013. The main frame is made transparent for clarity.
Figure 47:
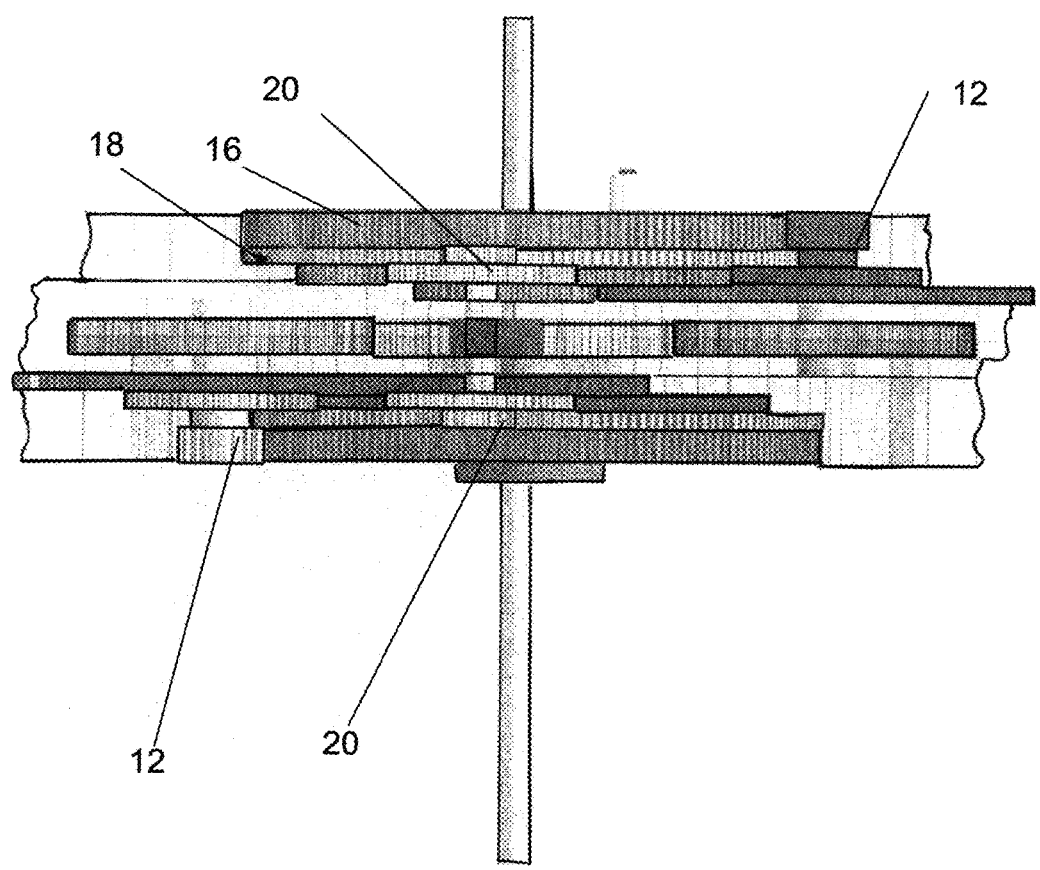
Figure 48:
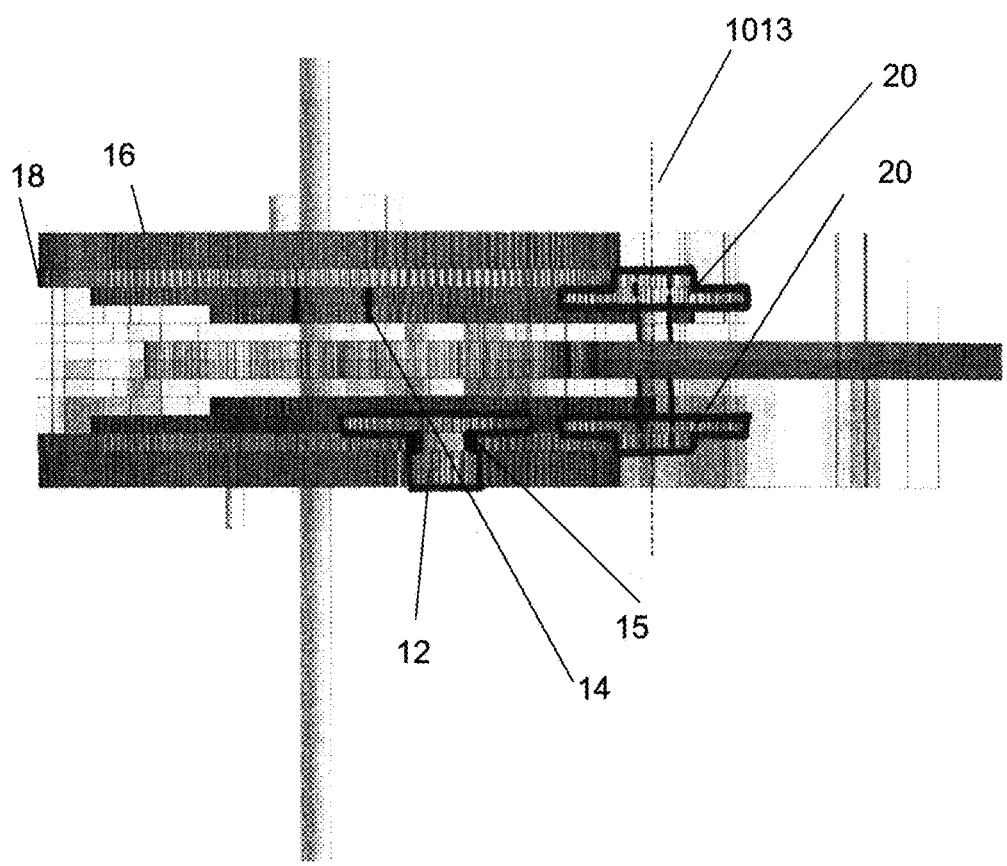
FIG. 48—Front view showing planetary-gear-changing-mechanism. The main-frame is made transparent for clarity.
Figure 49:
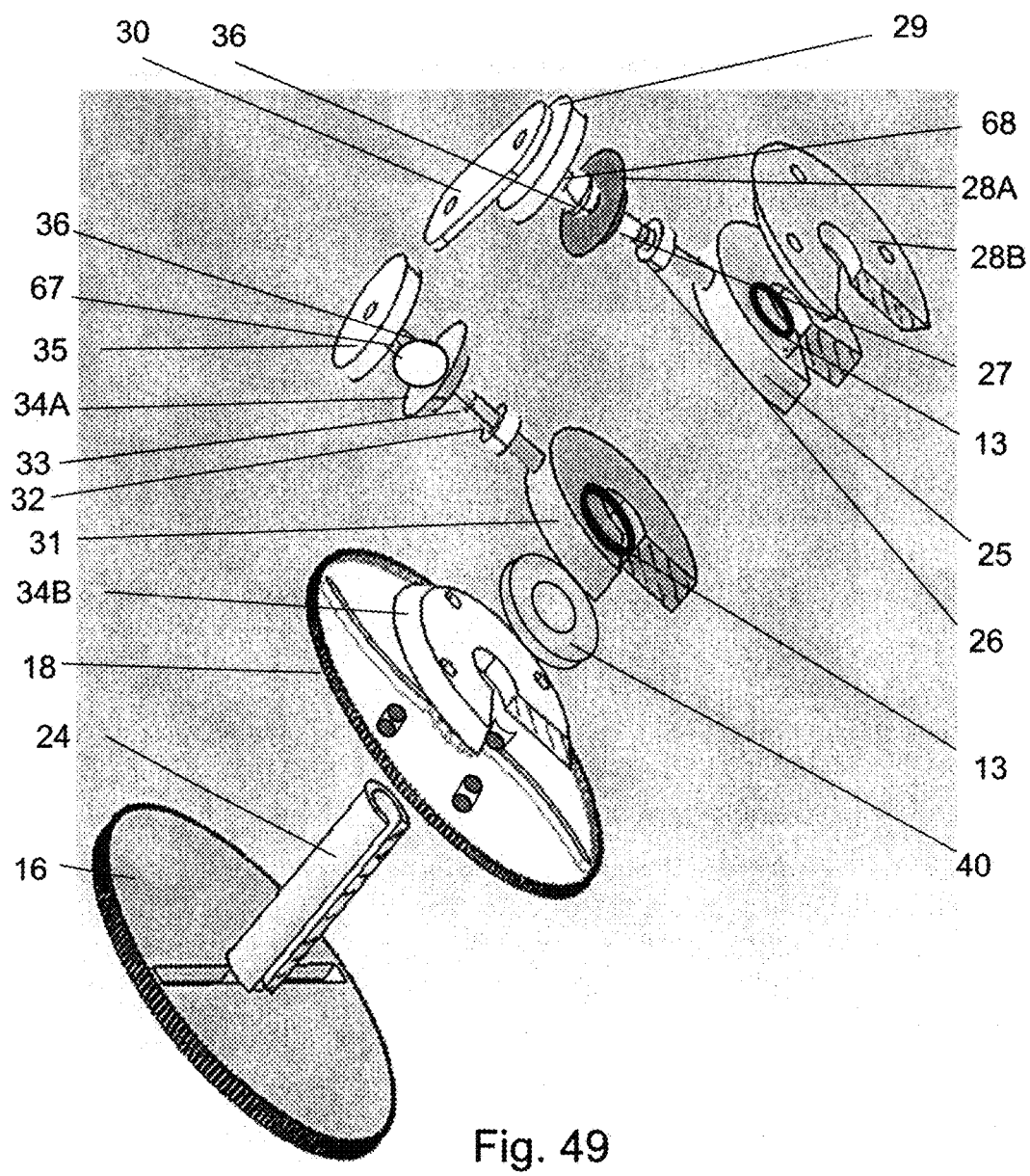
FIG. 49—Exploded view showing control mechanism—Differential Mechanism, showing component arrangements and working (perspective view).
Figure 50:
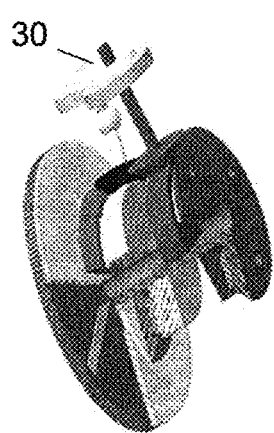
FIG. 50 thru 55—Views describing the ratio changing operation of the differential mechanism at various stages—shown partially sectioned to explain the function and interior details.
Figure 51:
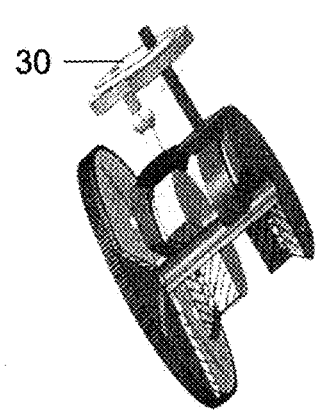
Figure 52:
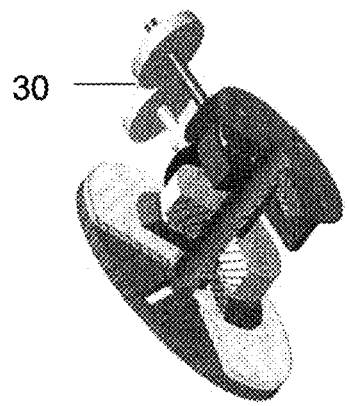
Figure 53:
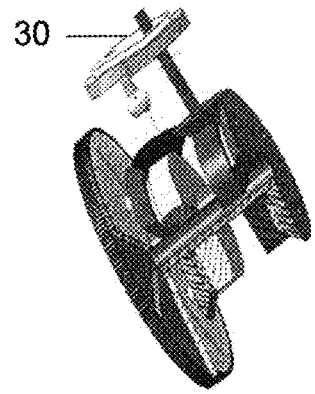
Figure 54:
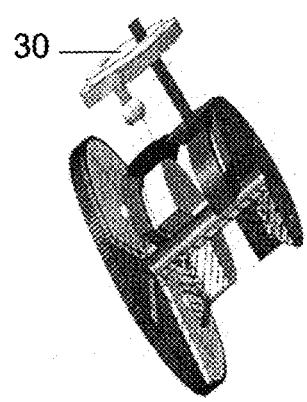
Figure 55:
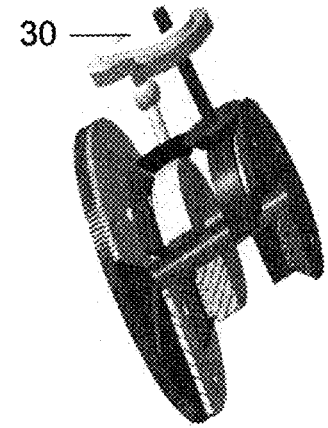

The Working and the Concept of the Main CVT:

When the input disk 16 rotates, by the 'scotch yoke' mechanism the crank pin 42 moves the Cross-Rack assembly 44 in the direction parallel to the rack 64. The distance traveled by such movement is directly proportional to the distance of the axis of the crank pin 42 from the axis 1021 as shown in FIG. 45B) of the input disk 16. By altering this distance, the distance travelled by the cross-rack assembly 44, this is termed as "stroke" can be altered. Since the work done is constant, which is a product of force applied multiplied by the distance traveled (F*stroke). For a smaller stroke, the force applied is greater and for a longer stroke, the force applied is smaller. However, the motion is back and forth oscillation. This force from the linear back and forth motion of the rack 64 is later transferred to a pinion 47 as a rocking motion. The torque generated by this rocking motion is directly proportional to the force applied from the rack 64. This is transferred to an output sprocket/gear via a one-way bearing/computer controlled clutch/ratchet mechanism 50 to a unidirectional rotation. This unidirectional rotation is further delivered to the wheels.

Arrangement of Transmission of Power from Engine/Power Source to Input Disk 16:

By using a set of non-circular gears, the driving 8 and the driven 9, the rate of change in angular displacement at the input disk 16 is altered. The output from the Shaft-Input 4 is transferred through a set of non-circular gears and then transferred to the input disk 16 via five intermediate circular gears. The non-circular driving gear 8 is mounted directly on the Shaft-Input 4. The driven non-circular gear 9 is mounted on the Intermediate-Gear-Shaft 6, which is mounted on two Intermediate-Gear-Shaft-Bearings 7 and placed on the two Frame-Main-housings 1.

The intermediate circular gear-C1 10 is mounted on the Intermediate-Gear-Shaft 6, with a direct connection to the driven non-circular gear 9. The intermediate circular gear C2-C3 11 is mounted on the Shaft-Input 4, free to spin with a Bearing-circular gear C2-C3 14. The intermediate circular gear C4-C5 15 is mounted on the Intermediate-Gear-Shaft 6 that is free to spin with a Bearing-circular gear C4-C5 15 and intermediate circular gear C5 drives the input disk 16. The radius of these intermediate circular gears are chosen such that the input disk 16 completes one revolution when the driving non-circular gear 8 completes one revolution. It should satisfy the conditions—$rC2/rC1=n1$, $rC4/rC3=n2$, and $rdisc/rC5=n1*n2$ and the K value will be 1.

Reason Behind the Need for a Circular Gear Between the Non-Circular Gears when the Profile Interferes/Multiple Contacts at the Same Instant:

Depending on the values chosen for the variables "R", "K" and "CTR" the shape of the non-circular gears could have multiple contact points at any given point of time. From the equations for the non-circular gear profiles, it can be seen that the radius of the driven non-circular gear 9 is lower than the Shaft-Input 4 it is mounted on over a wide region and reaches zero at two locations. In addition, there is a potential that, due to the shape of the profile, the driven non-circular gear 9 and the driving non-circular gear 8 may have multiple contact points at a given time. This can be eliminated by inserting an Intermediate circular gear-non-circular gear connector 62 between the two non-circular gears. This increases the distance between the two non-circular gears and eliminates the issue of multiple contact point at any given time. The longitudinal axis of the intermittent circular gear may be restricted to move only along an imaginary path or line 1011 connecting the longitudinal axes of the non-circular gears 8 & 9.

Concept Behind Using Ratio Changing Mechanism:

In order to change the input to output ratio, the location of the crank pin 42 must be changed. This can be achieved by rotating the ratio cam plate 18 with respect to input disk 16. While there are several ways to use this relative angular displacement of the ratio cam plate 18 and the input disk 16 to achieve radial translation of the crank pin 42, one way to accomplish this would be to use the slots in the ratio cam plate 18 and the input disk 16. Here the ratio cam plate 18 has a slot with a certain profile. When the ratio cam plate 18 is rotated with respect to the input disk 16 this profile forces the crank pin 42 to move in radial direction of the disk axis This is because the axis of the crank pin 42 is placed at the intersection of the slot in the input disk 16 and the slot in the ratio cam plate 18. When the crank pin 42 is closer to the axis 1021 of the input disk 16 the stroke is shorter and since the work done is constant, the force is increased. Similarly with the crank pin 42 is farther from the axis 1021 of the input disk 16, the stroke is longer and since the work done is constant, the force is decreased. The challenge here is move the crank pin 42 to move in a radial direction when the input disk 16 spins at a high RPM. To achieve this the ratio cam plate 18 and the input disk 16 are controlled to either synchronously or asynchronously rotate and a ratio changing mechanism is used to use this relative angular velocity is used to move the crank pin 42 in a radial direction. Another challenge here is to have the ratio cam plate 18 and the input disk 16 spinning synchronized during normal operation, and when the ratio change is desired, the input disk 16 and the ratio cam plate 18 should have a relative angular velocity. By using one of the three mechanisms described below, a relative angular velocity between the input disk 16 and the ratio cam plate 18 can be achieved, when desired.

Methods to Achieve Nonsynchronous Rotation of the Input Disk and Ratio Cam Disk Using Control Mechanisms:

1. Planetary Mechanism:

A set of intermediate carrier circular gears, C4a, and C5a 20 shown in FIG. 26 are axially connected and mounted on a common carrier shaft 21 with its axis 1013. C4a is identical to the circular gear C4 and C5a is identical to the circular gear C5. The movement of this common carrier shaft axis 1013 is restricted to a circular slot/path 1024, which is at a constant distance from the rotation axes of the input disk 16 and the ratio cam plate. The gear C4a is radially connected to gear C3 and the gear C5a is radially connected to the ratio cam plate 18. C5 is radially connected to the input disk 16 and C4 is radially connected to gear C3. A ratio-changing lever-planetary mechanism shown in FIGS. 46A & 46B, pivoted on the frame enables the location of the carrier shaft 21 to move along the slot 1024. The carrier shaft 21 is forced to stay at the intersection of the slot 1024 in the Frame-Main-housing 1 and the slot 1012 in the ratio-changing-lever-planetary-mechanism 23. Moving the ratio-changing-lever-planetary-mechanism 23, the location of the carrier shaft 21 is displaced. While the location is being displaced, there is a relative angular displacement between the input disk 16 and the ratio cam plate 18.

Figure 56:
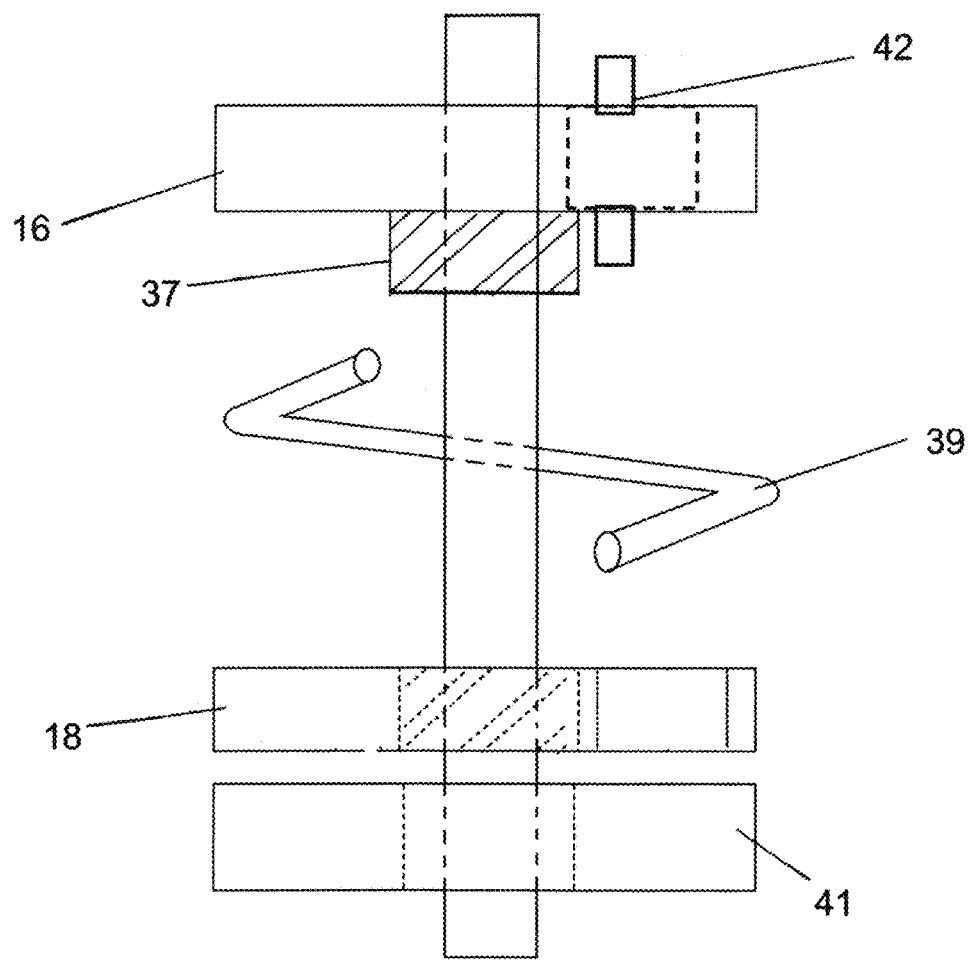
FIG. 56—Assembly showing working of control mechanism—Spiral Flute Mechanism (side view).
Figure 57A:
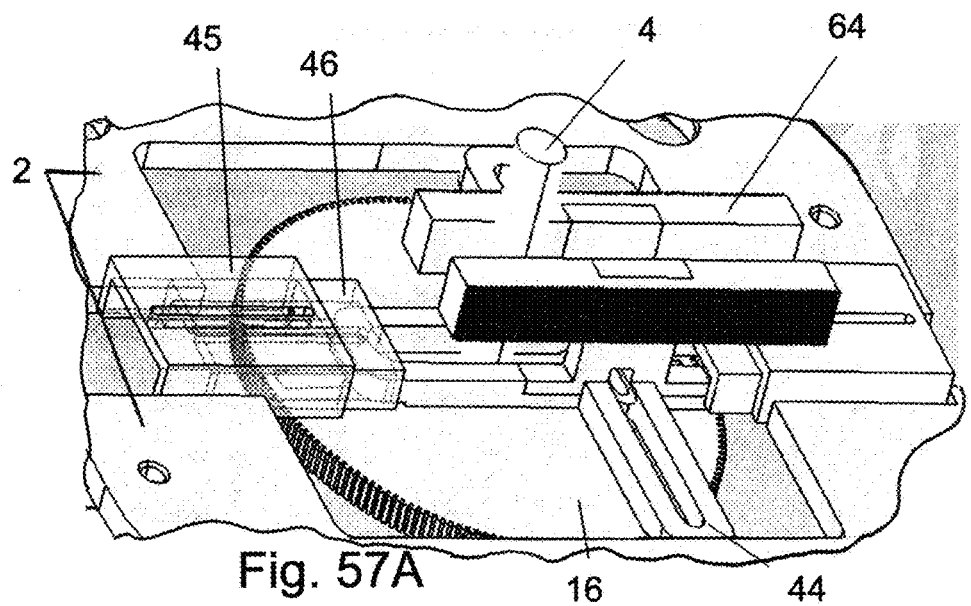
FIG. 57—Details of telescopic mechanism
A—Perspective view. The primary and secondary on one side made transparent to show details.
B—Top view
FIG. 58—Exploded view of one-way bearing assembly (pinion partially sectioned showing interior details).
Figure 57B:
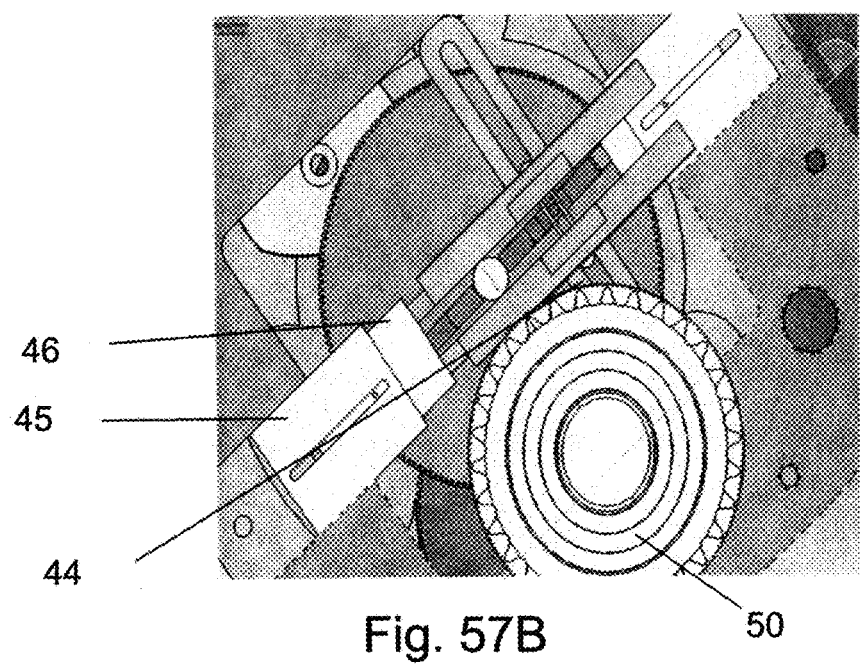
Figure 58:
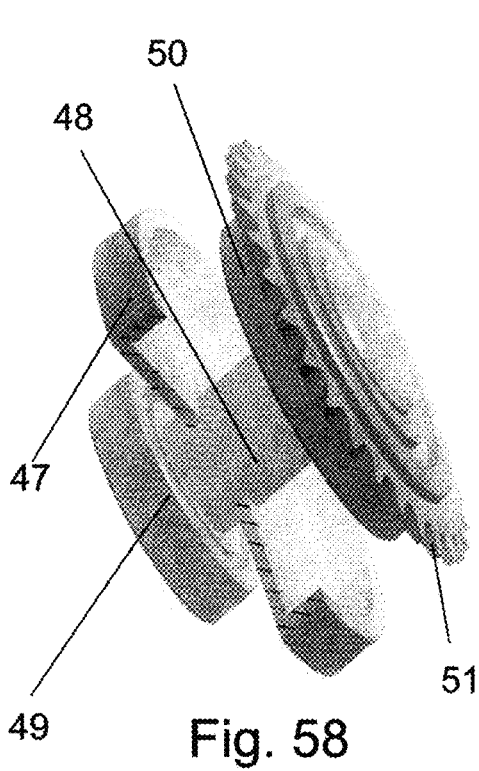

2. Spiral Flute Mechanism:

A spiral fluted input disk collar 37 with twisted profile is axially attached to the input disk 16. Slots matching the twisted profile of the spiral flute 37 is broached on the ratio cam plate 18 and placed co-axial to the input disk 16. When the distance between the ratio cam plate 18 and the input disk 16 remain unchanged, the input disk 16 and the ratio cam plate 18 spin synchronized. While the distance between the input disk 16 and the ratio cam plate 18 is being altered, the relative angular velocity between the input disk 16 and the ratio cam plate 18 changes as the ratio cam plate 18 is forced to rotate with respect to the input disk 16 due to the twisted profile of the spiral flute input disk collar 37 and the matching profile broached on the ratio cam plate 18. This axial translation is achieved with a ratio-changing-lever-spiral-flute-mechanism 41 that pushes a thrust bearing 40 attached to the ratio cam plate 18 towards the input disk 16. As shown in FIG. 56, this is sprung back with a compression spring 39 placed between the input disk 16 and the ratio cam plate 18.

3. Differential Mechanism:

A stationary differential collar large bevel gear 28b is axially attached to the input disk 16 via a sleeve-input disk-bevel 24. A stationary differential collar 25 shown in FIG. 32, which is co-axially spaced to the Stationary differential collar large bevel gear 28b, by a thrust bearing 40 is free to spin independently with respect to the Stationary differential collar large bevel gear 28b. The stationary differential collar 25 is restricted to move axially with respect to the Stationary differential collar large bevel gear 28b. A free to spin stationary differential collar spur gear shaft 27 is placed normal to the axis of the stationary differential collar 25 in a stationary differential collar spur shaft bearing 26 placed in the stationary differential collar 25. A stationary differential collar small bevel gear 28a and a stationary differential collar spur gear 29 is axially and rigidly attached to the stationary differential collar spur gear shaft 27 and the stationary differential collar small bevel gear 28a is paired with the stationary differential collar large bevel gear 28b.

Similarly,

A dynamic differential collar large bevel gear 34b is co-axially placed parallel to the ratio cam plate such that they spin synchronized but allowing displacement between them along the axis. A dynamic differential collar 31 which is co-axially placed to the dynamic differential collar large bevel gear 34b spaced by a thrust bearing 40 is free to spin independently with respect to the dynamic differential collar large bevel gear 34b. The dynamic differential collar 31 is restricted to move axially with respect to the dynamic differential collar large bevel gear 34b. A free to spin dynamic differential collar spur gear shaft 33 with a universal joint 36 placed in its axis is placed normal to the axis of the dynamic differential collar in a Dynamic differential collar spur shaft bearing 32 placed in the dynamic differential collar 31. A dynamic differential collar small bevel gear 34a and a dynamic differential collar spur gear 35 is axially and rigidly attached to the dynamic differential collar spur gear shaft 33 and the dynamic differential collar small bevel gear 34a is paired with the dynamic differential collar large bevel gear 34b. The universal joint 36 is common to the dynamic differential collar spur gear shaft 33 and the dynamic small bevel gear shaft 67, allowing a small mismatch.

A spacer keeps the two spur gears in contact. The spacer 30 is free to move axially with respect to dynamic differential collar spur gear shaft 33.

Here the stationary differential collar 25 and the dynamic differential collar 31 are identical and interchangeable.

By this arrangement the dynamic flow train is as described below a. The stationary differential collar large bevel gear 28b spins stationary differential collar small bevel gear 28a.

b. The stationary differential collar small bevel gear 28a spins the stationary differential collar spur gear shaft 27.

c. The stationary differential collar spur gear shaft 27 spins the stationary differential collar spur gear 29.

d. The stationary differential collar spur gear 29 spins dynamic differential collar spur gear 35.

e. The dynamic differential collar spur gear 35 spins dynamic differential collar spur gear shaft 33.

f. The Dynamic differential collar spur gear shaft 33 thru the universal joint 36 spins the dynamic differential collar small bevel gear 34a.

g. The dynamic differential collar small bevel gear 34a spins the dynamic differential collar large bevel gear 34b.

h. The dynamic differential collar large bevel gear 34b spins the ratio cam plate 18.

Since the two large bevel gears, the two small bevel gears, and the spur gears are identical and same size respectively, when the dynamic differential collar 31 is stationary, the angular velocity of the ratio cam plate 18 is synchronized with the input disk 16. While the dynamic differential collar 31 is being rotated with respect to the stationary differential collar 25, there will be a relative angular displacement between the input disk 16 and the ratio cam plate 18.

Concept Behind Using Telescopic-Sleeve to Enable a Compact Design:

For this design to work the length of the input slot 1006 of the cross-rack assembly 44 has to be a value equal to 2*stroke+input-shaft diameter+2*minimum material thickness+2*the distance to reach the rack guide 1025. This entire length has to be guided by the rack guide 1025. Since the Frame-Cross-rack-guide 2 also has to accommodate the travel of the rack 64, the opening portion of the rack guide 1025 should have a width at least as the diameter of the input disk 16 or it will be out of reach when the rack 64 travels to one side to the extreme. The Frame-Telescopic-Guide 3 extends the support and as a result, the overall length of the can be reduced by the "distance to reach the rack guide 1025." This also makes it possible for the Frame-Main-housing 1 to be shorter by that distance. Prongs are provided in the design of the cross-rack assembly 44 and in the secondary telescopic sleeves 46 to extend the telescopic-sleeves. The body of the cross-rack assembly 44 collapses the telescopic-sleeves.

Figure 36:
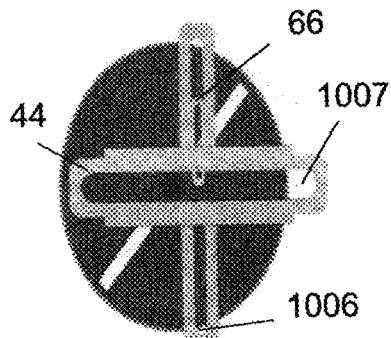
Figure 37:
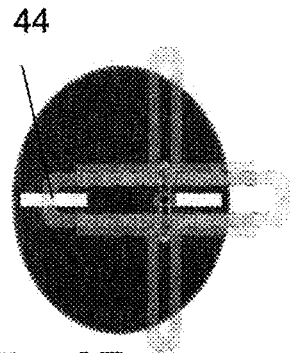
Figure 38:
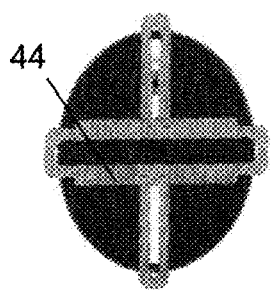
Figure 39:
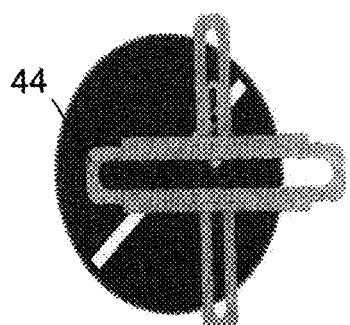
Figure 40:
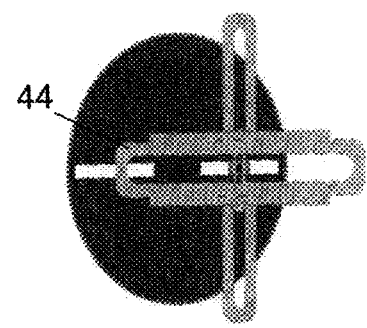
Figure 41:
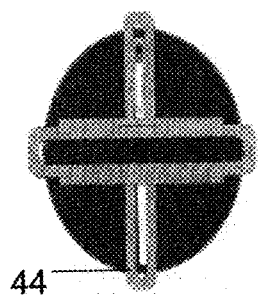
Figure 42:
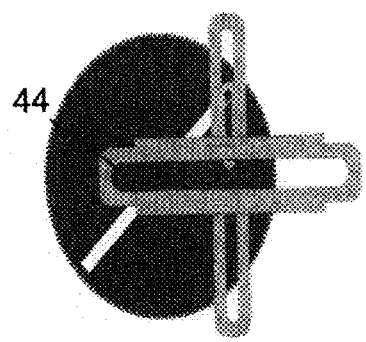
Figure 43:
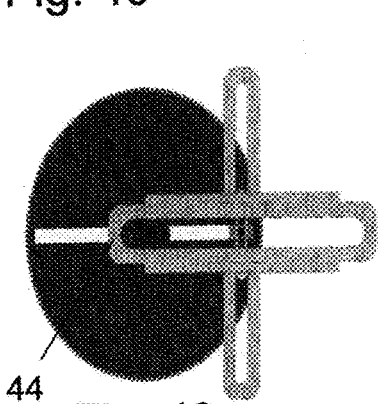
Figure 44:
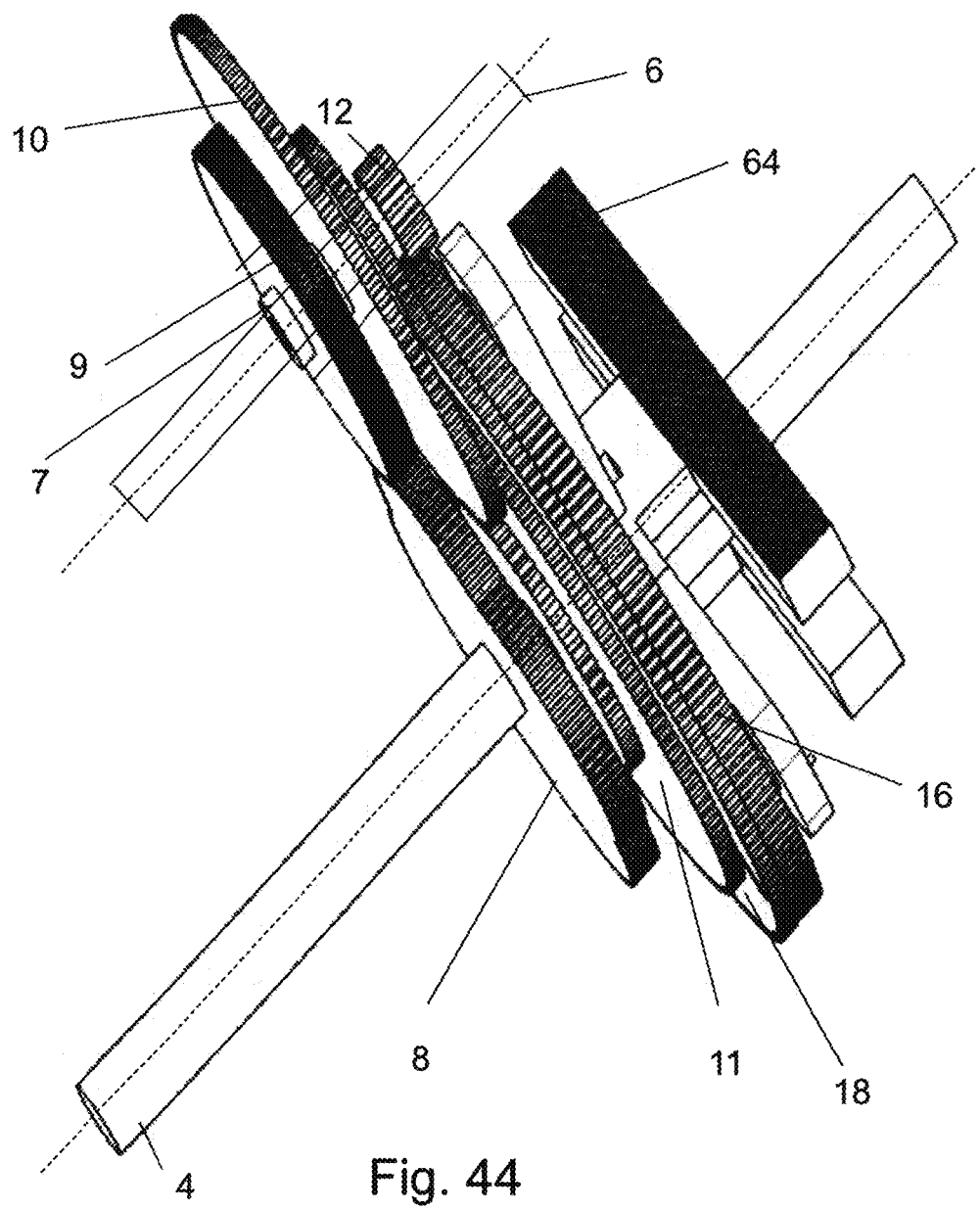

Concept Behind Use/Working Function of Slider Guide:

The crank pin is much smaller than the input-shaft 4. Since both the slots 1006 & 1007 cross each other, there is a potential that the crank pin can slip into the input-shaft slot 1007. This is eliminated by using a slider guide 66 as shown in FIG. 36 that is larger than the input-shaft slot 1007. This is made to float in the crank pin slot 1006 enclosing the crank pin 42.

Overlap of Power Transmission, Design in Implementing the Concept:

To ensure smooth transition from one module 1001 to the next, for a brief period both the modules are active and engage when the output from both of them reach a constant and uniform value. The first module disengages while it is still in the functional region 1017 and the second module is well in the functional region 1017. The rack velocity has a constant velocity region 1017 followed by deceleration to zero velocity and then followed by reversal of direction and then acceleration to constant velocity which is the non-functional region 1005. This is shown in FIG. 68, however the graph only shows absolute velocity of the rack.

Figure 79:
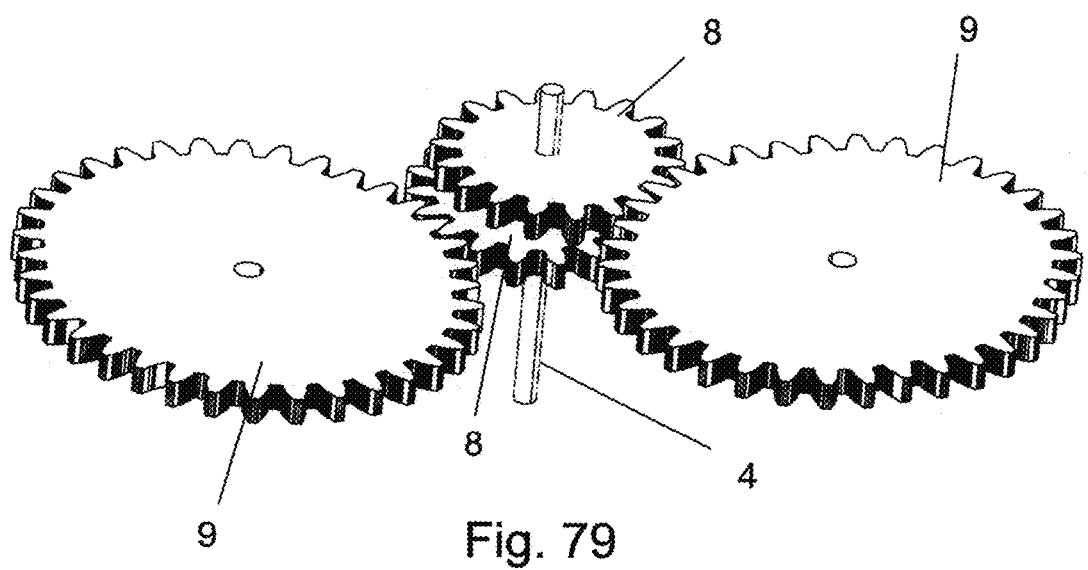
FIG. 79—Multiple driving and driven non-circular gears are stacked in 2 layers and the sum of all the active functional portions of the two non-circular gears pairs is ≥360.

The driving and/or driven non-circular gears 8 & 9 can be stacked in multiple layers as shown in FIG. 79, such that the sum of all the functional portion of the all non-circular gears pairs in all modules is ≥360° and placed such that the functional portion of each module is active in sequence with an overlap. The stacking of the multiple non-circular gear pairs in layers can be beneficial to fit the whole assembly into the available envelop.

Modules 1001 and their Assembly Layout and Constraints:

All the four modules share one common input-shaft 4 and one common driving non-circular gear 8. Two of the modules share a common input disk 16 and control mechanism. The Racks are placed at 90° phase shift to the next. To accommodate this, the driven non-circular gear 9 is oriented at 45° with the driven non-circular gear 9 phased at 45° relative to the other non-circular driven gear. Also due to the fact the non-circular gears are symmetric it can be also oriented at 135°. This adds up to a 90° phase shift between racks.

Concept of Power Transfer/Link Between Modules:

When the modules operate in sequence, they must be linked before the power is transferred to the wheels. This is achieved by using a power link shaft 52 that has gears or sprocket to link the output from each module such that it has a continuous power to the wheels. The power is also transferred in sequence.

Reverse Gear Mechanism:

The output from the power link shaft 52 is coupled with Input shaft for miter bevel gears 58 of a miter bevel gear differential mechanism. The output of these miter bevel gears 59 will therefore revolve in opposite direction. The Shaft-Output 61 of this differential mechanism is placed co-axial to the output miter bevel gears 59 with clearance so that free to spin independently with respect to the output miter bevel gears 59. Two collars with a clutch are placed on the Shaft-Output 61 allowing them to move axially. These can be made to link with either of the output miter bevel gears 59, which revolve in opposite direction. When one of the collars is made to link, by means of clutch, with a particular output miter bevel gear 59 and the Shaft-Output 61 will revolve is a particular direction. It will reverse its direction if the link is swapped to the other output miter bevel gear 59.

Neutral Gear Mechanism:

When the collars are not in link with any of the output miter bevel gears 59, the collar and the Shaft-Output 61 are not restricted and, thus, they are free to spin in any direction and function as a "neutral" gear.

Park Mechanism:

When the collars are in link with both the output miter bevel gears, the collar is restricted from spinning and functions as a "parking" gear.

Feature and Mechanism to Compensate Vibration:

1. Dummy crank pin 43: The crank pin 42 is placed off-center when the input disk 16 revolves. This imbalance will result in vibration. To compensate this, a dummy crank pin 43 is placed at same distance 180° apart. This is moved by the same ratio cam 18 that moves the crank pin 42. This movement is identical to the movement of the crank pin 42. The cam slots are made identical at 180° apart.

2. Dummy rack 55 for counter oscillation: As the input disk 16 rotates the cross-rack assembly 44 has an oscillatory motion which will result in vibration. It is cancelled by having an appropriate Dummy rack 55 oscillating in the opposite direction. This is achieved by attaching a Wheel-vibration cancellation 56 in contact with the rack 64, which will spin back and forth. Bringing an appropriate mass in contact with the wheel at 180° apart will compensate for this vibration.

Co-Axial Input and Output Option Feature:

When co-axial input and output is desired, this can be achieved by adding Co-axial output element with internal gear 65 which is paired with the Power link Sprocket/Gear 54. A Bearing-Co-axial output element 38 is placed between Shaft-Input 4 and the Co-axial output element with internal gear 65, allowing them to spin independently.

Constraints:

When K=1 and R=1, the conditions that apply are:

The number of teeth on driving non-circular gear 8 should be same as number of teeth on driven non-circular gear 9, which means their perimeters are the same. i.e. they complete 1 revolution at the same time even though the instantaneous speeds may not be the same. Alternatively, the portion that does not follow the desired shape, i.e. the portion where minimum radius 'r' is used, 2nd set of non-circular gears can be used optionally in parallel to achieve the goal.

$rc2/rc1=n1$, $rc4/rc3=n2$, and $rdisc/rc5=n1*n2$ apply.

Desired but not mandatory $(rv1+rv2)=(rc3+rc4)=(rc5+rdisc)=(rc1+rv2)=ctr$. This will allow placing of all the driving and driven gears on two common shafts, of which one of them being the input-shaft 4. When n1=n2 then rdisc=rc5 and all the intermediate gears have no significance since their gear ratios cancel each other, therefore they can be eliminated and the driven non-circular gear 9 can be directly linked to the input disk when R=integer or reciprocal of an integer.

The invention claimed is:

1. A continuously variable transmission, comprising:
at least one module, comprising:
(a) an input disk having a radial slot with a length extending in a substantially radial direction, disposed between
(b) a ratio cam disk comprising a non-radial slot extending at least partially in a non-radial direction and
(c) a rack assembly comprising one or more racks having longitudinal axes that are normal to a longitudinal axis of a first slot, the first slot receiving
(d) a crank pin, wherein the crank pin is disposed in the radial slot of the input disk, in the non-radial slot of the ratio cam disk, and in the first slot of the rack assembly, and extends parallel to a longitudinal axis of the input disk;
(e) one or more pinions mounted on one or more pinion shafts and coupled with the corresponding one or more racks; and
(f) at least one driven non-circular gear that has a functional and a non-functional region being operably connected to the input disk;
wherein the at least one module is arranged such that at least one driving non-circular gear, provided on a drive shaft, rotates about a longitudinal axis with a uniform angular velocity and meshes with and drives the at least one driven non-circular gear causing a non-uniform angular velocity of the input disk about its longitudinal axis, wherein the crank pin reciprocates the rack assembly with the rack assembly being only allowed to move along the longitudinal axes of the one or more racks, and the reciprocation of the rack assembly rotates the one or more pinions, and the rotation of the one or more pinions periodically alternates directions and is converted to unidirectional rotation of an output gear or sprocket, wherein the output gear or sprocket is rotated by the one or more pinion shafts and at least one of a one-way bearing, a ratchet mechanism, or a computer controlled clutch, which engages the output gear or sprocket to the pinion when the pinion rotates in a specific direction.

2. The continuously variable transmission of claim 1, wherein the ratio cam disk and the input disk are positioned adjacent and coaxial to one another, and are controllable to rotate synchronously or nonsynchronously via a control mechanism and when rotating substantially synchronously, a longitudinal axis of the crank pin is maintained at a substantially constant distance from the longitudinal axis of the input disk, and when rotating nonsynchronously the distance from the longitudinal axis of the crank pin to the longitudinal axis of the input disk is altered via a ratio changing mechanism.

3. The continuously variable transmission of claim 2, wherein the control mechanism comprises a first pair of bevel gears, comprising: a first driving bevel gear and a first driven bevel gear having dissimilar pitch diameters, wherein the first driving bevel gear is coaxially connected to the input disk and the first driven bevel gear is coaxially connected to a driving spur gear, which in turn, rotates a substantially identical driven spur gear spaced at a set distance from the driving spur gear by use of a spacer, and the driven spur gear is coaxially connected to a second driving bevel gear of a second pair of bevel gears, rotating a second driven bevel gear of the second pair of bevel gears, wherein the first driving bevel gear is substantially identical to the second driven bevel gear and the first driven bevel gear is substantially identical to the second driving bevel gear, and the second driven bevel gear is coaxially connected to the ratio cam disk; when there is no relative movement between longitudinal axes of the driving spur gear and the driven spur gear, the input disk and the ratio cam disk rotate substantially synchronously, and when there is relative movement between the longitudinal axes of the driving spur gear and the driven spur gear, the input disk and the ratio cam disk rotate nonsynchronously, and this nonsynchronous rotation, via the ratio changing mechanism, alters the distance between the longitudinal axis of the input disk and the longitudinal axis of the crank pin, which in turn alters a linear displacement of the rack assembly.

4. The continuously variable transmission of claim 3, wherein a universal joint is disposed at an intersection of the longitudinal axis of the driving spur gear and the longitudinal axis of the first driven bevel gear or at an intersection of the longitudinal axes of the driven spur gear and a longitudinal axis of the second driving bevel gear or both.

5. The continuously variable transmission of claim 2, wherein the control mechanism comprises a spiral-fluted collar that is attached coaxially to the input disk, and the ratio cam disk defines a hole with a shape matching the spiral-fluted collar and is disposed substantially coaxial with the spiral-fluted collar, such that the ratio cam disk and the input disk are separated by a distance and the ratio cam disk and the input disk rotate substantially synchronized when the distance separating the ratio cam disk and the input disk is kept substantially constant and the input disk and the ratio cam disk cam rotate nonsynchronously while the distance is being altered and the non-sychronyzed rotation of the ratio cam disk and the input disk is used to alter the distance between the longitudinal axis of the crank pin and the longitudinal axis of the input disk via the ratio changing mechanism.

6. The continuously variable transmission of claim 2, wherein the input disk and the ratio cam disk have a gear profile on their perimeter with identical pitch curves and the control mechanism comprises two sets of axially connected pairs of intermediate circular gears where the two gears within each pair have dissimilar pitch curves and one of the gears in each pair have identical pitch curves, with axes parallel to the longitudinal axis of the input disk and the longitudinal axis of the ratio cam disk, spaced such that one gear from one of the sets is configured to radially mesh with the input disk and one gear of the same pitch curve from the other one of the sets is configured to radially mesh with the ratio cam disk, and the other gear from both the pairs having identical pitch curves are configured to radially mesh with another common intermediate circular gear which is placed coaxially with the input disk and the ratio cam disk, and further wherein longitudinal axes of the axially connected intermediate circular gears are restricted to move only along a path that is at a substantially constant distance from the longitudinal axis of the input disk, and during this motion the input disk and the ratio cam disk rotate nonsynchronously and this nonsynchronous rotation of the ratio cam disk and the input disk is used to alter the distance between the longitudinal axis of the crank pin and the longitudinal axis of the input disk via the ratio changing mechanism.

7. The continuously variable transmission of claim 2, wherein the ratio changing mechanism comprises: the crank pin, the ratio cam disk and the input disk, wherein the crank pin is disposed in the radial slot of the input disk and the non-radial slot of the ratio cam disk such that a relative angular velocity between the input disk and the ratio cam disk causes the crank pin to move radially along the radial slot of the input disk, altering the distance between the longitudinal axis of the input disk and the longitudinal axis of the crank pin.

8. The continuously variable transmission of claim 1, further comprising a plurality of modules, wherein the plurality of modules are oriented such that the functional region of the at least one of the driven non-circular gears is in contact with a functional region of the driving non-circular gear; and the functional region of the at least one driven non-circular gear has overlapping engagement with a functional region of another driven non-circular gear, such that the functional region of the driving non-circular gear is in contact with the functional region of at least one driven non-circular gear at all times during a complete rotation of the input disk between consecutively engaged driven non-circular gears in a sequence.

9. The continuously variable transmission of claim 8, wherein an amount of overlapping engagement between the functional regions of the driving non-circular gear and the consecutively engaged driven non-circular gears is substantially identical.

10. The continuously variable transmission of claim 1, wherein a substantially rectangular slider guide having a substantially rectangular slot is positioned in the first slot of the rack assembly and surrounds the crank pin.

11. The continuously variable transmission of claim 1, wherein the rack assembly further includes a dummy rack, wherein the dummy rack is provided adjacent to the rack assembly, having a mass substantially identical to a mass of the rack assembly, that moves in a substantially opposite direction of the rack assembly, to compensate for vibration caused by imbalance due to the reciprocation of the rack assembly.

12. The continuously variable transmission of claim 1, wherein the input disk comprises a second radial slot located opposite the radial slot in a circumferential direction about the longitudinal axis of the input disk; the ratio cam disk comprises a second non-radial slot located opposite the non-radial slot in a circumferential direction about the longitudinal axis of the ratio cam disk; and a dummy crank pin having a mass substantially identical to a mass of the crank pin that slides in an opposite direction of the crank pin along the second radial slot of the input disk and the second non-radial slot of the ratio cam disk, to compensate for vibration caused by imbalance due to an off-center revolution of the crank pin.

13. The continuously variable transmission of claim 1, wherein the rack assembly further comprises a second slot, substantially orthogonal to the first slot, for receiving the drive shaft.

14. The continuously variable transmission of claim 1, wherein the functional region of the at least one driven non-circular gear engages a functional region of the at least one driving non-circular gear causing the rack assembly to move at a substantially constant velocity and the non-functional region of the at least one driven non-circular gear engages a non-functional region of the at least one driving non-circular gear causing the rack assembly to decelerate to a stop and accelerate in the opposite direction to the substantially constant velocity.

* * * * *